(12) United States Patent
Altay et al.

(10) Patent No.: US 10,623,268 B2
(45) Date of Patent: Apr. 14, 2020

(54) CONTROLLER-ENABLED TOPOLOGY MANAGEMENT IN SELF BACKHAULING WIRELESS MESH AND RELAY NETWORKS

(71) Applicant: NETSIA, INC., Sunnyvale, CA (US)

(72) Inventors: Can Altay, Istanbul (TR); Bengi Mizrahi, Istanbul (TR); Arda Akman, Istanbul (TR); Seyhan Civanlar, Istanbul (TR)

(73) Assignee: NETSIA, INC., Sunnyvale, CA (US)

( * ) Notice: Subject to any disclaimer, the term of this patent is extended or adjusted under 35 U.S.C. 154(b) by 0 days.

(21) Appl. No.: 15/945,816

(22) Filed: Apr. 5, 2018

(65) Prior Publication Data

US 2019/0312784 A1    Oct. 10, 2019

(51) Int. Cl.
*H04L 12/28* (2006.01)
*H04L 12/24* (2006.01)
*H04J 1/16* (2006.01)
*H04W 84/18* (2009.01)

(52) U.S. Cl.
CPC ............ *H04L 41/12* (2013.01); *H04W 84/18* (2013.01)

(58) Field of Classification Search
CPC ............................ H04L 41/12; H04W 84/18
USPC ......................................... 370/252, 331, 386
See application file for complete search history.

(56) References Cited

U.S. PATENT DOCUMENTS

| | | | |
|---|---|---|---|
| 2007/0037577 A1* | 2/2007 | Dalsgaard | H04W 48/04 455/436 |
| 2015/0173111 A1* | 6/2015 | Agarwal | H04W 8/04 370/329 |
| 2018/0167854 A1* | 6/2018 | Enomoto | H04W 36/0061 |

* cited by examiner

*Primary Examiner* — John Pezzlo
(74) *Attorney, Agent, or Firm* — IP Authority, LLC; Ramraj Soundararajan

(57) ABSTRACT

A special controller and a special node design for wireless communications are disclosed for generating a control messaging exchange on a wireless control channel between a controller and each mesh node: (a) to alter the wireless network topology, comprised of interconnected nodes, for load distribution, (b) to select better quality wireless links for control and data channel communications, and (c) to take away the burden of frequent route calculations from each node, making packet forwarding more efficient and optimal.

13 Claims, 16 Drawing Sheets

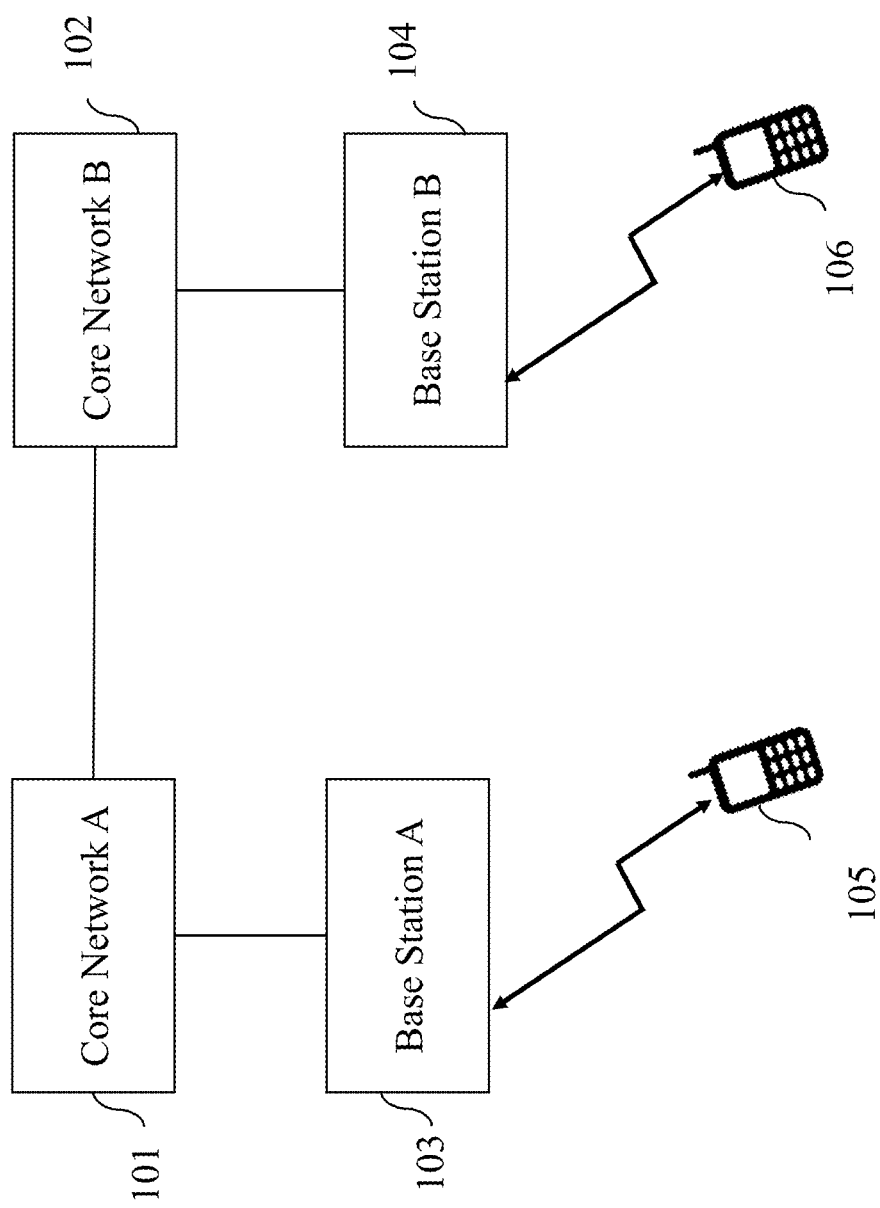

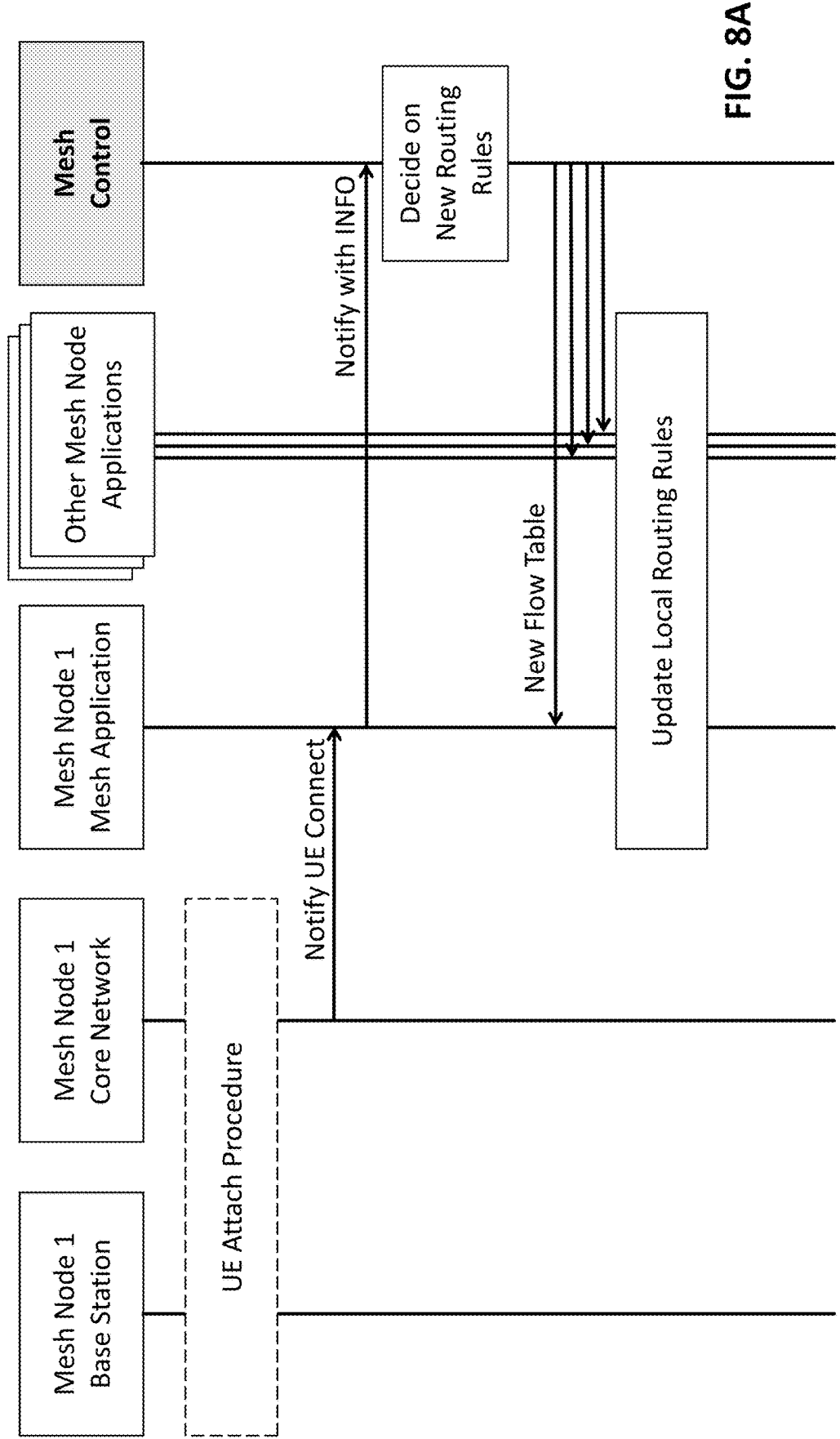

CONTROLLER-ENABLED TOPOLOGY MANAGEMENT IN SELF BACKHAULING WIRELESS MESH AND RELAY NETWORKS

BACKGROUND OF THE INVENTION

Field of Invention

Aspects of the present disclosure relate to a self-backhauling mesh/relay system with a controller and a method that is specifically designed for 5G and beyond to perform an instantly reconfigurable network topology, load balancing and resource partitioning across the network.

Discussion of Related Art

Any discussion of the prior art throughout the specification should in no way be considered as an admission that such prior art is widely known or forms part of common general knowledge in the field.

In remote locations, where well-planned wireless infrastructure is not yet deployed, or when the base stations are moving as in military or public safety applications, or in locations where there are major coverage holes, bringing the cellular data communications service for everyday use or under emergency conditions using a fixed core network facilities infrastructure is impossible. In such areas, it is much easier to use wireless mesh and relay networks wherein the communications is achieved in a multi-hop manner essentially using much smaller and simpler relay or mesh nodes that are directly interconnected with wireless/air interfaces to relay data traffic. There is a fundamental difference though between a relay network and a mesh network. In a relay network, the traffic between a pair of wireless user equipment is always relayed by a so called 'relay node' or a series of relay nodes (each node being a base station) towards a macro base station wherein the routing decision is made by the 'core network' attached to that base station. The goal with relay nodes is usually to extend the coverage area of a macro base station.

In contrast, in a mesh network, the mesh nodes are interconnected and can perform routing of traffic across a pair of user equipment, without needing to forward/relay traffic towards a macro base station. The networking between mesh nodes is sometimes referred as 'ad hoc'.

A mesh network is self-healing. Meaning, when a node fails, the data is automatically re-routed. The built-in redundancy of having multiple wireless pathways available helps to make the mesh network both robust and reliable. Mesh networks are also fairly scalable as we can extend the network simply by adding more nodes.

There are many alternative air interface technologies to use cellular mesh and relay networks. Orthogonal Frequency-Division Multiple Access (OFDMA) is a popular air interface technology because of its advantages in high data transmission rate, mitigation in frequency selectivity in multi-path environments, robustness against frequency selective fading, and ability to provide frequency diversity in multi-user environments. In order to meet the public safety, military and rural community communications requirements, mesh networks must establish uninterrupted and reliable device-to-device and device-to-infrastructure communications aligned with LTE standards and beyond. IEEE 802.16 standards define various aspects of wireless broadband standards.

Software defined network (SDN) is a recent networking paradigm and a strong candidate to become the architecture of the future Internet. A typical SDN is decoupled into two planes: a data plane comprised of 'switches', which perform data forwarding, and a control plane connecting all switches to a 'controller', which calculates routes and sends routing information to the switches in the form of 'flow-tables'. Doing so, the packet forwarding and route calculation tasks are completely decoupled. The switches perform fast packet forwarding without needing to process reachability information for route calculation, while the controller performs fast calculation of routes for all switches.

An SDN controller is software-based and logically centralized (but, possibly physically distributed and replicated). The SDN controller transforms complex operator policies into low-level forwarding rules in the form of flow tables, while switches forward data packets according to these rules. Current SDNs employed in data centers (DCs) and Wide Area Networks (WANs) are wire-line networks, in which the backbone topology is fixed. Therefore, an SDN controller does not try to control or optimize the layout of the network topology nor does it attempt to change the connectivity of the access network; instead it only computes routes for data packets for a given fixed backbone and access network topology. Furthermore, the control plane, i.e., the connections from the switches to the controller is fixed unless there is a facility failure.

According to an aspect of this invention, a relay or mesh network can be conceived with a special SDN controller, called 'controller', which provides a centralized control of the underlying wireless nodes primarily for topology management. The controller can be a single centralized entity, or it can be a group of controllers that pose as a single entity. Handling of a group of controllers using the master/slave architecture, for example, using a clustering software such as JGroups is well understood in prior art. The controller connects to each node (mesh or relay) with a so called 'control channel' over a wireless connection, just like the wireless connections between nodes.

The control channel, which can be a TCP/IP link, must be a highly reliable wireless channel to transmit important control messages to or from the nodes. With an LTE-based mesh/relay network, the wireless connections are expected to be much more reliable and more easily configurable using Multiple Input Multiple Output (MIMO) antennas and the beam-forming technology. Thus, according to an aspect of this invention the controller can be implemented to control a group of mesh/relay nodes or an entire mesh/relay network using highly reliable wireless control channels. Furthermore, with the network's self-healing capabilities, the wireless links can be added to provide multiple pathways to control channels.

The connectivity (control channel) between the controller and the underlying nodes can be in-band or out-of-band. When in-band, the control channel between the controller and the underlying node is multi-hop, meaning, there may be other nodes between the controller and that node. When out-of-band, the control channel between the controller and an underlying node is a direct connection, meaning, there are no other nodes between the controller and that node. We should note that the in-band or out-of-band attribute of the to control channel should not be confused with an in-band/out-band relay node, a term often used in the literature to describe if backhaul and random access data flows of a relay node use the same/different frequency bands. The control channels may use an allocated frequency band dedicated for control channels that is not used for any other communications. Alternatively, there may be no dedicated frequency band. Each such control channel implementations are feasible and applicable to this invention.

According to a key aspect of this invention, the controller not only determines the routes for packet data traffic, but also can modify the data network and control network (i.e., the collection of all control channels) topology by changing the interconnectivity of the wireless links between the mesh/relay nodes. This unique feature of the controller distinguishes it from the controller of a typical wire-line SDN. The interface between an SDN controller and switch/node is defined by the OpenFlow protocol (Reference: OpenFlow Switch Specification 1.5.1, Open Networking Foundation, Mar. 26, 2015), which does not currently account for the possibility of forced changes of the control and/or data network topology using control messages from the controller.

The controller (the system of invention) can collect topology information from each mesh/relay node (referred as 'node' from here on), wherein topology is defined as (a) the node-to-node connectivity, (b) node-to-controller connectivity, and (c) the radio access user equipment (UE)-to-node connectivity. It can determine a better topology (a) for optimizing specific criteria such as data packet delay or throughput or quality of experience, or (b) for self-healing under a network failure, or (c) for providing a forced topology change to the entire network to satisfy a network-wide objective. It is worthwhile to note that, according to prior art, once an SDN controller discovers the topology between switches in a wire-line SDN using OpenFlow Discovery Protocol (OFDP), a variant of Link Layer Discovery Protocol (LLDP), unless new switches are added or failures occur in the network, the topology remains fixed. It is virtually the opposite in the mesh/relay network's ad-hoc topology wherein the network topology is always in flux. The modification of topology applies to both data channels that carry data packets between user equipment as well as control channels, and the UE-to-node connections due to handover. According to this invention, each node continuously feeds information on the quality of wireless connections to the controller, not only of those live cellular connections, but also other potential connections. Upon receiving such information, the controller can optimize the network topology according to said specific criteria.

A key aspect of this invention is handling of frequent changes in the network's UE connectivity to nodes due to handover of mobile/moving terminals. In a typical wire-line SDN, the hosts (or their LANs) are wired to access switches and usually do not change their access connectivity. Therefore, the typical SDN's users (aka hosts) are fixed resulting in the routing tables that change rather infrequently. In comparison, mobile UEs constantly change location, and as a result, the routing tables change often. In an embodiment, the nodes inform the controller about changes in UE connectivity on an event driven basis as a result of which the controller updates the flow tables.

This invention is a new type of controller software and a node software (i.e., an application within each node (mesh or relay)), and a control messaging sequence between said controller software and said application to instantly change the network connectivity/topology and doing so, for example, redistributing the UE traffic load among mesh nodes to meet the aforementioned requirements or to improve the control or data channel quality. Each node can possibly make a local decision and communicate directly with its neighbor nodes to force local topology changes. However, such a decision can't be made on a global scale without a controller that has the visibility of the entire network. As opposed to broadcasting the topology and routing information across peer nodes and causing the nodes to make localized decisions, the controller, which has the global visibility of the network, can more optimally and advantageously change the network topology for a better load distribution.

Embodiments of the present invention are an improvement over prior art systems and methods.

SUMMARY OF THE INVENTION

In one embodiment, the present invention provides a method as implemented in a mesh control software that is part of a controller, the controller controlling a plurality of nodes, the controller having a first base station that is connected to at least one node via a first set of backhaul user equipment associated with the node, the node having a second base station, a plurality of directly attached radio access user terminals and a mesh app software running within, the method comprising: (a) node establishing a control channel towards the mesh control software and the mesh app software within node to exchange control messages; (b) receiving, from the node via the mesh app software, a list of identifiers of one or more neighboring nodes and said directly attached radio access user terminals; (c) receiving one or more unknown data packets from the node via the mesh app software; (d) sending a flow-table to the mesh app software for use at the node to route data packets; (e) sending a topology directive to the mesh app software instructing said second base station associated with the node to reject a remote backhaul user equipment associated with a neighboring node to alter network topology.

In another embodiment, the present invention provides a method as implemented in a mesh control software that is part of a controller, the mesh control software controlling a network comprised of at least a first and second mesh nodes, the two mesh nodes interconnected via a backhaul user terminal associated with the first mesh node that is attached to a second base station component of the second mesh node via an air interface forming adjacency between the first and second two nodes, each of the two mesh nodes having a first and second mesh app software running within, and a first radio access user equipment is initially connected to a first base station of the first mesh node, the method comprising: (a) the mesh control software sending a topology directive message to the first mesh app software to request handing over the first radio access user equipment to the second mesh node; (b) upon approval of the request by the second mesh app software of the second mesh node, said request being sent over a control channel between first and second mesh nodes, the first mesh app adding the first radio access user equipment into its UE reject list and triggering a handover from the first base station of the first mesh node to the second base station of the second mesh node; and (c) disconnecting the first radio access user equipment from the first mesh node and connecting the first radio access user equipment to the second mesh node.

In yet another embodiment, the present invention provides a topology alteration method as implemented in a mesh control software that is part of a controller, the mesh control software controlling a network comprised of at least a first, second and third mesh nodes, the first, second and third mesh nodes associated ith internal first, second and third base stations respectively, the first, second and third mesh nodes associated with a first, second, and third backhaul user terminals, respectively, the first backhaul user terminal being remote to the second mesh node, and the second backhaul user terminal being remote to the third mesh node, the first, second and third mesh nodes associated with a first, second, and third mesh app software, respectively, the first, second and third mesh nodes initially interconnected as follows: (a) the first backhaul user terminal of first node being attached to the second base station component via a first air interface forming an adjacency between the first and second nodes, and (b) the second backhaul user terminal of second node being attached to the third base station via a second air interface forming an adjacency between the second and third nodes, each of the three mesh nodes having directly attached radio access user terminals, the method comprising the steps of: (a) maintaining an user equipment (TiE) reject list in each of the first, second and third mesh app software, each UE reject list containing a listing of those UEs whose connection attempt to that mesh node are to be rejected with an associated reject reason, along with at least an identifier of local backhaul user terminals associated with those UEs, so that when a given backhaul user terminal tries to attach to its local base station, the connection is rejected by its local base station forcing it to attach to a remote mesh node's base station; (b) sending, via the mesh control software, a topology directive message to the second mesh app requesting rejection of a connection request of the first backhaul user equipment to the second mesh app, the second mesh app adding the first backhaul equipment's identifier to its UE reject list and rejecting first backhaul user equipment's attachment to the second mesh node's base station; and (c) disconnecting the first backhaul equipment from the second mesh node's base station, while attempting to attach it to the third mesh node's base station, connecting and therefore altering the topology of connectivity between the three mesh nodes such that first node is now connected to third node instead of second node.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIGS. 1A and 1B depict data communication links of two-core-network and one-core-network-with-relays options, respectively.

FIGS. 8A and 8B illustrate the sequence diagrams of route management in UE attach and handover cases, respectively.

DESCRIPTION OF THE PREFERRED EMBODIMENTS

Figure 1B:
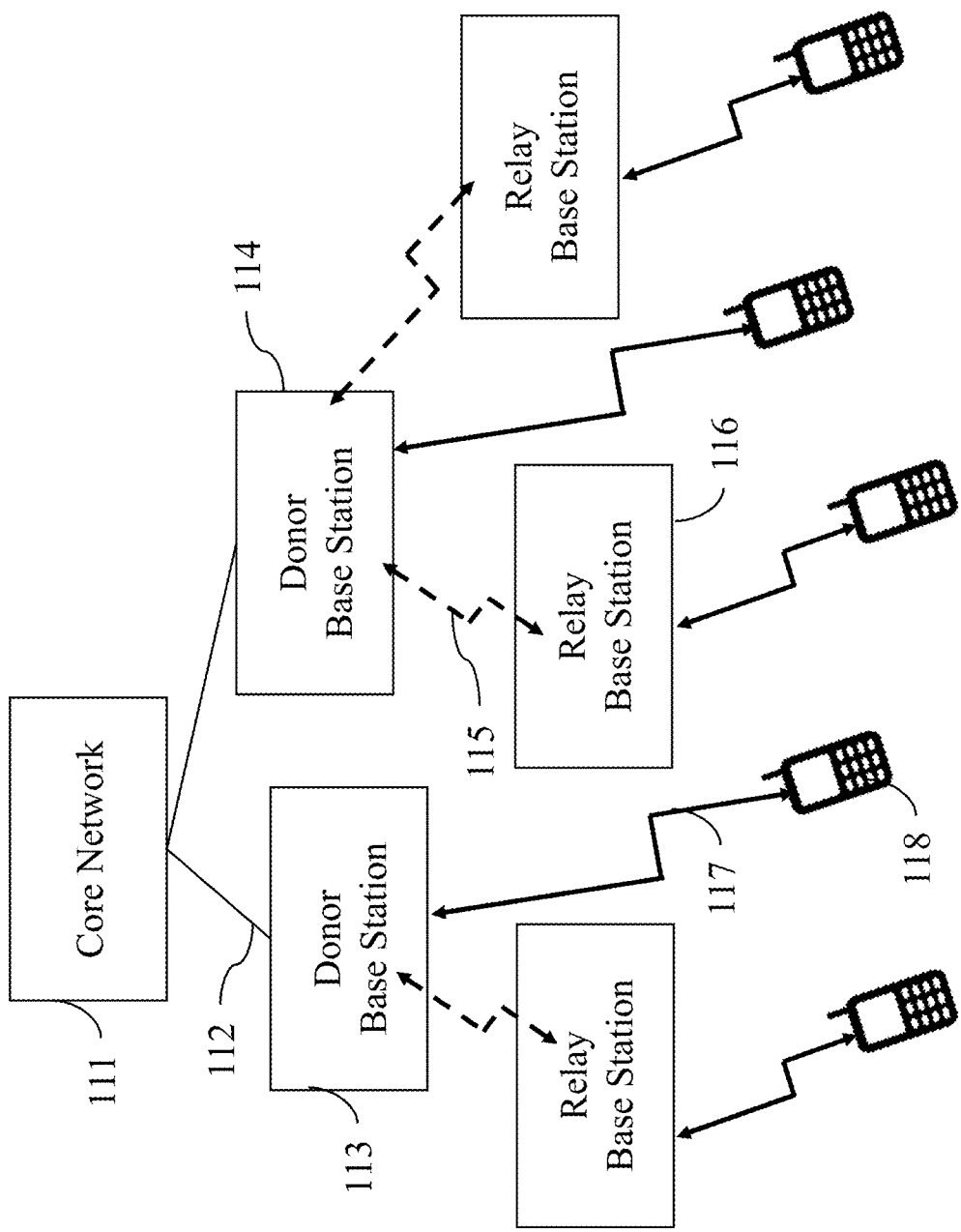

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The present invention provides a method, a special controller and a special node design for wireless communications that generate a control messaging exchange on a wireless control channel between a controller and each node (a) to alter the wireless network topology, comprised of interconnected nodes, for load distribution, (b) to select better quality wireless links for control and data channel communications, and (c) to take away the burden of frequent route calculations from each node, making packet forwarding more efficient and optimal. Here onwards, the descriptions and terms are used for mesh networks, but the same concepts apply to relay networks. The controller is envisioned as similar in its components to a node (including a small base station and a core network component) with the addition of 'Mesh Control' software, which acts as the controller. Each mesh (or relay) node has an application called 'Mesh App', which communicates with the 'Mesh Control' software using the control channel. A 'Relay Control' and 'Relay App' will be applicable to a relay network, but functionally these components will be similar or the same as the mesh equivalent, and therefore will not be detailed further.

As mentioned earlier, the control channel between each node and the controller is either a single-hop, or a multi-hop in-band channel of a cascade over the air connections (called backhaul), each connection created via an integrated user equipment (called backhaul UE) deployed in said node that attaches to the base station component of the adjacent node or the controller. The interconnectivity between adjacent nodes is also achieved using a backhaul UE, each node being furnished with a number of backhaul UEs. In this invention, backhaul UEs can be either configurable to select the desired base station to connect, or they may be regular user equipment. Topology management for both of these backhaul UE options will be covered.

The Mesh Control software within the mesh controller communicates with a Mesh App implemented within each mesh node according to an aspect of this invention through the wireless control channel. Additional control messages per this invention are needed for control communication between the mesh control and mesh application that includes standards-compliant OpenFlow messages. However, the detailed description of OpenFlow control messages are not presented in this patent, as it is not part of the invention. As an example of new control messages, each Mesh App informs the Mesh Control about UE handovers on a per event basis using a special 'INFO message'. This process allows the Mesh Control to instantly discover changes in the network. A dynamic network topology change and load redistribution of UEs are also achieved according to an aspect of this invention by the Mesh Control (a) deciding on the list of UEs (including backhaul UEs) to be rejected or accepted by each Mesh Node (a rejection of a wireless connection simply prevents forming of a wireless connectivity), said list being reconfigurable by the Mesh Control altering the adjacency of mesh nodes and the connectivity of UEs to mesh nodes, and (b) a sharing mechanism of the aforementioned 'UE reject list' with the mesh nodes on the control channel using a 'TOPOLOGY DIRECTIVE message' specified here, attaining a periodic or event driven topology changes. In addition, the controller once determines the overall routing of data packets across the mesh network, it sends forwarding tables to mesh nodes compliant with the OpenFlow protocol as in prior art. Exchange of control messages according to an aspect of this invention, between the controller and nodes provides the advantage of centrally coordinated topology modification and routing across all nodes. In addition to the control channel between the node and the controller, each node is also connected to each of its neighbor node via a separate node-to-node control channel and a node-to-node data channel. The node uses its node-to-node data channel to route data packets of UEs to its neighbor node wherein it uses the node-to-node control channel to communicate local control messages with its neighbor node (such as a hello message).

According to another aspect of this invention, each node sends information about the quality of wireless channels of adjacent mesh nodes to the controller in another new control message called the 'LINK QUALITY INFO message'. This information can be gathered by a sniffing backhaul UE of a node. A regular backhaul modem can be used to sniff the surrounding base stations by consequently connecting, measuring, and disconnecting to each. Moreover, there can be highly customized backhaul modems that do not connect but only measure signal quality and read the identity of surrounding base stations by their system information block broadcasts. The link quality information of adjacent mesh nodes aids the controller to make decisions on topology changes to improve the quality of the overall network.

Cellular communication technologies usually require a high amount of infrastructure behind the base stations for routing and forwarding of data packets to their destinations. In a traditional cellular deployment, as illustrated in FIG. 1, the User Equipment (UE) A 105, wherein a UE is always mobile equipment such as a cell phone, connects through the air interface to Base Station A, 103, and registers to Core Network A, 101. The Core Network is also known in prior art as Packet Core Network (PCN). The Core Network is necessary for routing of data packets within and outside its coverage area. Although not shown in the diagram, Base Stations may interconnect to neighboring Base Stations with a cellular interface for mainly signaling and packet forwarding during handover. The Base Station and Core Network, together, are responsible for interference mitigation and coordination in case same frequency bands are used between neighboring base stations. When the UE A, 105, wants to send a data packet to UE B, 106, it sends a request to Core Network A, 101. The Core Networks are responsible for session establishment and routing of packets. Once the session is established, the UE A, 105, can send packets traversing the path through Base Station A, 103, Core Network A, 101, Core Network B, 102, Base Station B, 104, to UE B, 106. Note that other than the air interface between the UEs and the Base Station, all other interfaces connecting entities in such a network are all wire-line. Furthermore, the locations of base stations and core network components are pre-planned and fixed in contrast to mesh or relay networks where these components are mobile. Just a single node with a core network and base station can serve a large number of UEs, providing connectivity between any pair of attached UEs for data and voice transmission.

Existing standardization of cellular networks also includes relay networks, which support self-backhauling wireless relay base stations. The cellular relay network, presented in FIG. 1b includes a single core network, 111. All of the cellular network related control plane and data forwarding is handled by core network, 111, after passing the donor base stations, 113 and 114, through cable connections, 112 (generally fiber). The donor base stations, 113 and 114, are macro base stations that are capable of both serving normal UEs, 118, through standard random access wireless link, 117, and serving relay base stations, 116, through wireless backhaul link, 115. The relay base stations, 116, forward the data traffic and control traffic, destined to core network 111, of the attached normal UEs to donor base station, 114, through wireless backhaul link 115.

From topology management perspective, factors such as the overload of connected subscribers or sudden functional detects can lead the operator to require topology alteration methodology. Namely, the wireless backhaul link, 115, can be forced to connect to another donor base station, 113, due to traffic overload in 114. A similar scenario is also possible when traffic load in 113 is too high, in which case the normal LIE, 118, may be forced to connect to relay base station, 116. Such topology management, which is controlled by the controller according to this invention, is required in both relay and mesh networks. Even though latter detailed description focuses on mesh networks, the invention is intended to cover both relay and mesh networks.

According to one embodiment of the invention, an apparatus for wireless communication is provided which should allow hopping of packets from one mesh node to another without using any wire-line backhaul infrastructure. An exemplary arrangement of the building blocks of an embodiment of the invention are shown in FIGS. 2a and 2b for the node and controller, respectively.

Figure 2A:
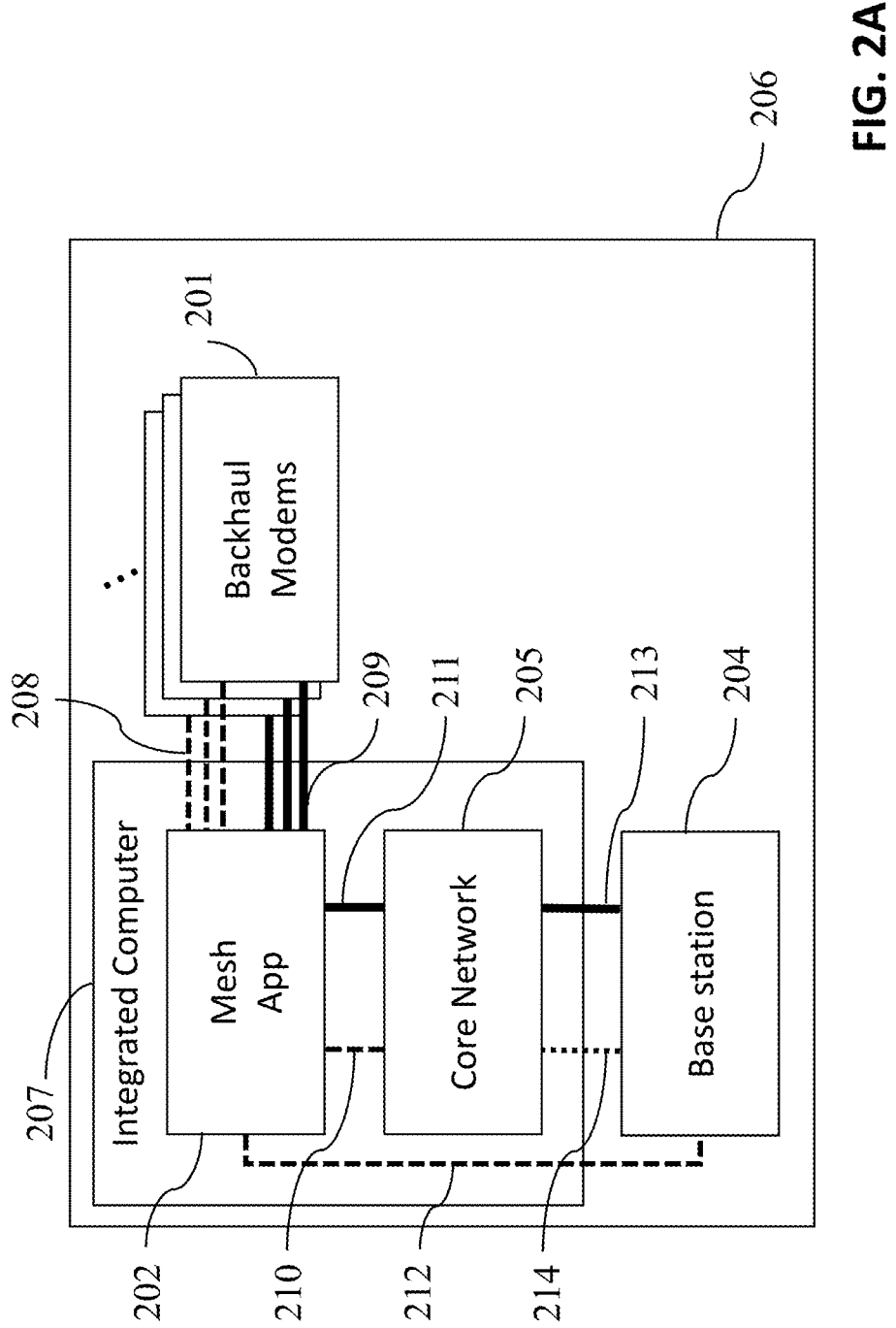
FIGS. 2A and 2B depict the contents of a node and the controller, comprising of the prior art entities and the components of this invention, respectively.
Figure 2B:
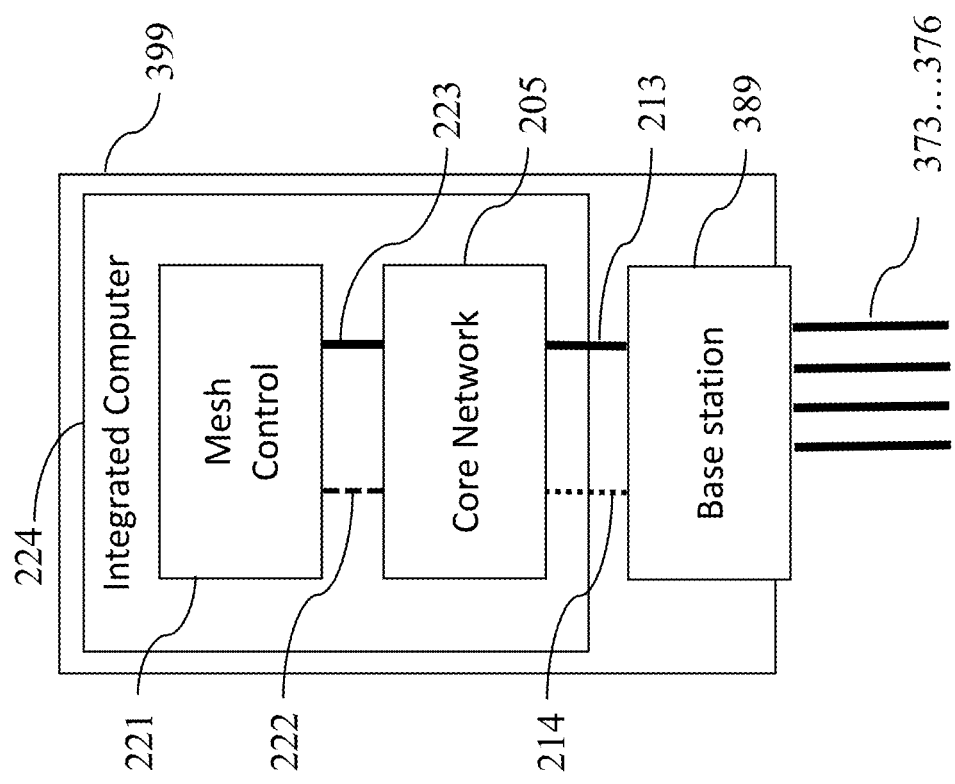

Box 206 of FIG. 2a shows the enclosure of a mesh node. Each mesh node comprises three hardware entities, a base station 204, an integrated computer 207, and one or more backhaul UEs/modems 201. The backhaul modems, 201, can be both regular control limited modems, or highly customized modems with custom sniffing and cell selection properties. Integrated computer 207 includes Core Network 205, and a topology and routing management application, Mesh App 202, which handles the functionalities of this invention. While the Backhaul UE (or simply called the 'modem'), 201, and the Core Network, 205, and Base Station 204 are entities that could be used directly from third parties, the Mesh Application (also referred here as the Mesh App), 202, is a new system specific to this invention. Note that according to prior art, a mesh node comprises of a Mesh Base Station, and a Core Network only. Mesh Base Station, 204, of one mesh node connects to a Backhaul UE (or modem), 201 of another mesh node over the air interface to provide the backhauling (or hopping) of data traffic. However, a Backhaul UE, 201, is never allowed to connect to the Mesh Base Station, 204, of its own Mesh Node, 206, enforced by Mesh App, 202, even though a Backhaul UE, 201, can normally connect to any base station.

Between the base station, 204, and core network, 205, the S1-AP interface, 213, includes the control channel, and the S1-U interface, 214, includes the IP tunneled data communication. Both of these interfaces are well defined in LTE standards documents, and may be replaced with other standard interfaces defined for UMTS or 5G.

According to one embodiment of this invention, Mesh App, 202, has three different control interfaces for: (1) management of the core network, 210, (2) management of the base station, 212, and (3) management of the backhaul modems, 208. Mesh App, 202, also has three types of data forwarding interfaces; (1) towards the backhaul modems, 209, to forward data packets to other mesh nodes by tunneling, (2) towards the backhaul modems, 209, to forward (unknown) data packets to the controller by tunneling, and (3) towards the core network, 211, to forward data packets to other mesh nodes by tunneling or to UEs directly attached to that mesh node without needing tunneling.

Backhaul UE/modem 201 is a general purpose UMTS (3G), LTE (4G), or 5G modem which is generally connected with a physical USB connection to the mesh node. There may be several backhaul modems per mesh node. However, each backhaul modem 201 can only be connected to one remote mesh node's base station or to the controller at a time. The functionality of the control interface, 208, is totally dependent on the modem selection. If the backhaul modem, 201, is a customized modem, 208 can provide manual cell selection or cell sniffing mechanisms. Otherwise, if the backhaul modem, 201, is regular modem, 208 may provide fairly limited functionality. In the case of regular modem deployment, cell selection procedure may be managed by core networks of adjacent mesh nodes. Two commonly available examples of the control interface are AT and QMI, neither of which provide the needed functionality for cell id or TAC/LAC specific cell selection, the importance of which will be described later. These control interfaces provide received signal power and signal to noise ratio (SINR) of the connected base station and an attribute to reset the backhaul modem.

Core Network 205 has a user interface for instantaneous notifications of UE attach, detach, handover, or cell reselection occurrences. It also provides an interface for configurable 'UE reject list' where each entry in the list contains the IMSI of a UE and a reject cause for 'attach reject' and 'tracking area update (TAU) reject' messages. When a UE is in that reject list of Core Network 205, and it tries to attach to Base Station 204, the connection gets rejected. Core network 205 also provides a Command Line Interface (CLI) for manual network initiated detach operations for a specific IMSI.

Base Station 204 can be a gNode-B for a 5G, an eNode-B for an LTE (4G), or a Node-B for a UMTS (3G) based network. Base station 204 provides a management interface, 212, to trigger handover for any technology. For UMTS (3G), the base station may also provide a configurable Access Point Name Control List (ACL), where each entry contains IMSI of the UE that can connect to the base station. ACL support provides access and topology control option with the base station control interface, 212, in UMTS (3G).

Box 399 in FIG. 2b illustrates a simplified block diagram of the controller. The controller comprises two hardware entities, a base station 389 and an integrated computer 224. Integrated computer 224 includes Core Network 205, and a topology and routing control application, Mesh Control 221, which handles the functionalities of this invention. While the Core Network and Base Station ties that could be used directly from third parties, the Mesh Control 221, is a new system specific to this invention. The interfaces between the base station and core network are the same as those of the mesh node, and therefore not detailed.

According to one embodiment of this invention, Mesh Control 221, has two different control interfaces for: (1) management of its local core network, and (2) management of the control channels towards the nodes. Mesh control, 221, also has a data forwarding interface towards its local core network, 223, to forward data packets it receives from one node to another node. These data packets received by the controller are also known as 'unknown' packets in SDN terminology. Any node receiving an unknown data packet (a packet for which there is no local flow-table entry) always forwards it towards the controller over the control channel, which in turn either discards it or forwards it towards the destination node (i.e., the node closest to the destination UE). Therefore, the control channel as the dual purpose of conveying/receiving control messages to/from the nodes as well as carrying unknown packets. Note that once the controller sends the flow-table entry to the node, it stops sending the unknown data packets to the controller, as it now knows how to forward the packet towards the destination. These are defined in OpenFlow specification and considered prior art.

Figure 3A:
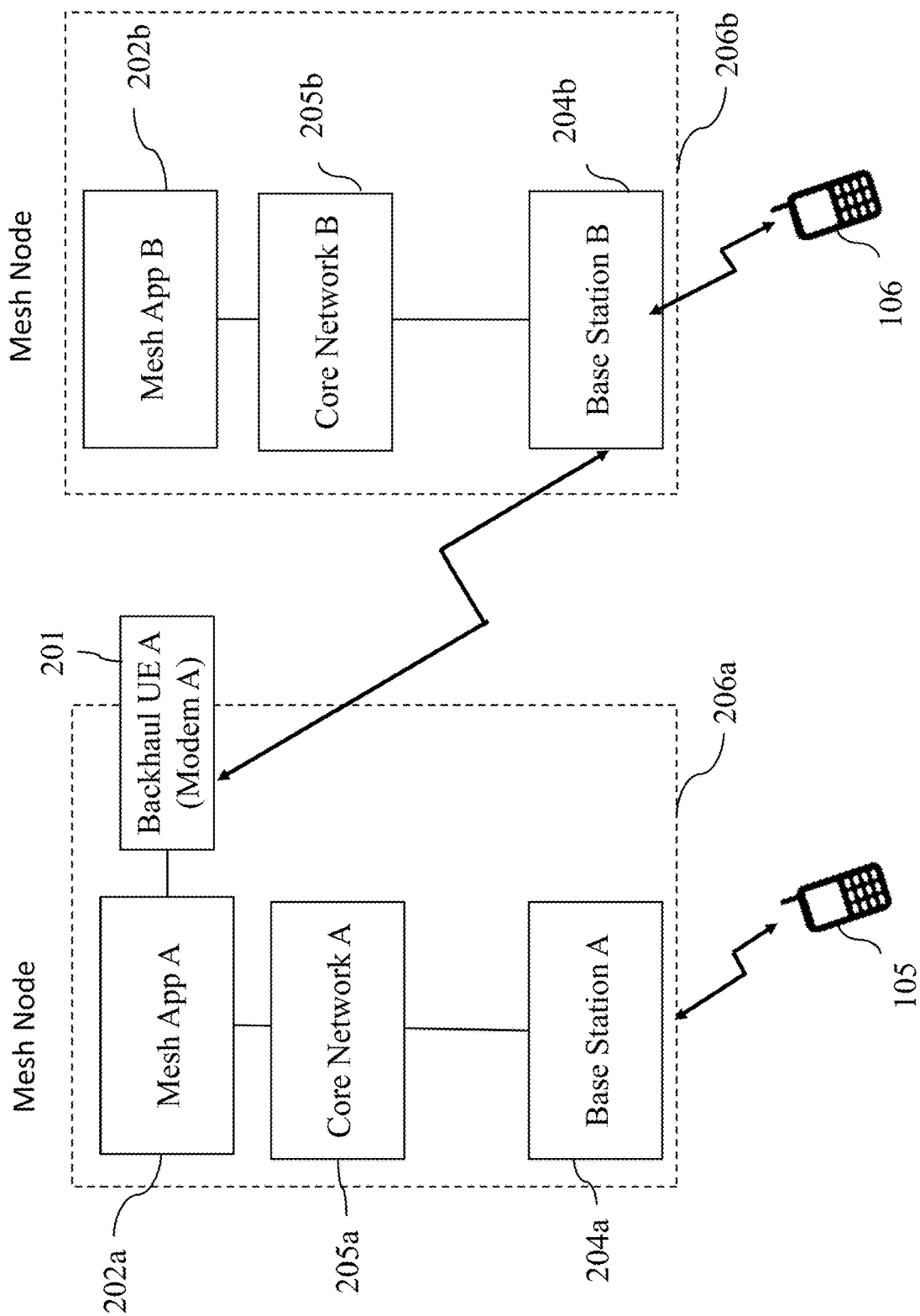
FIGS. 3A and 3B show the connectivity between two nodes, and a node and the controller according to an aspect of this invention, respectively.

FIG. 3a illustrates an example mesh network with two Mesh Nodes, 206a and 206b, connected via a backhaul radio connection. Radio Access (user) UE 105 is attached to one mesh node, 206a, in the network while Radio Access UE 106 is attached to another mesh node, 206b. UE 105 and 106 communicate with one another using the backhaul radio connection. Because they are attached to different mesh nodes, the data traffic from UE 106 is first sent to Mesh Base Station 204b via the radio access link. In turn, the traffic is routed from the Base Station 204b towards Backhaul UE 201 via the backhaul radio link, and then to Core Network 205a via Mesh App 202a towards Mesh Base Station 204a and to the UE 105 therefrom.

When a radio access the UE is connected to a base station of a Mesh Node, it is registered in its Core Network. Namely, the UE acquires its IP address from that Core Network. Note that a backhaul UE A 201 registers with the Core Network 205b, the Core Network of the adjacent Mesh Node, 206b, whereas radio access UE 105 registers with Core Network 205a, the Core Network of the Mesh Node it directly attaches to UE 105 obtains its IP address from Core Network 205a, while UE 106 and backhaul UE 201 obtain their IP addresses from Core Network 205b.

A Core Network obtains information about all UEs (both radio access of backhaul) from a Home Location Registrar (HLR) database within itself. This database in each Core Network contains the MIST of each UE along with the corresponding static and uniquely assigned IP address, which has to be preconfigured by the operator at the beginning of operation. Therefore, a Core Network knows all IP addresses used by radio access UEs attached to it. Note that for the packets of UEs to remain as unique within the Mesh Node, the Core Network has to disable Network Address Translation (NAT), so that the source and destination IP addresses remain as the original addresses and could be routable using the IP header of those data packets.

Figure 3B:
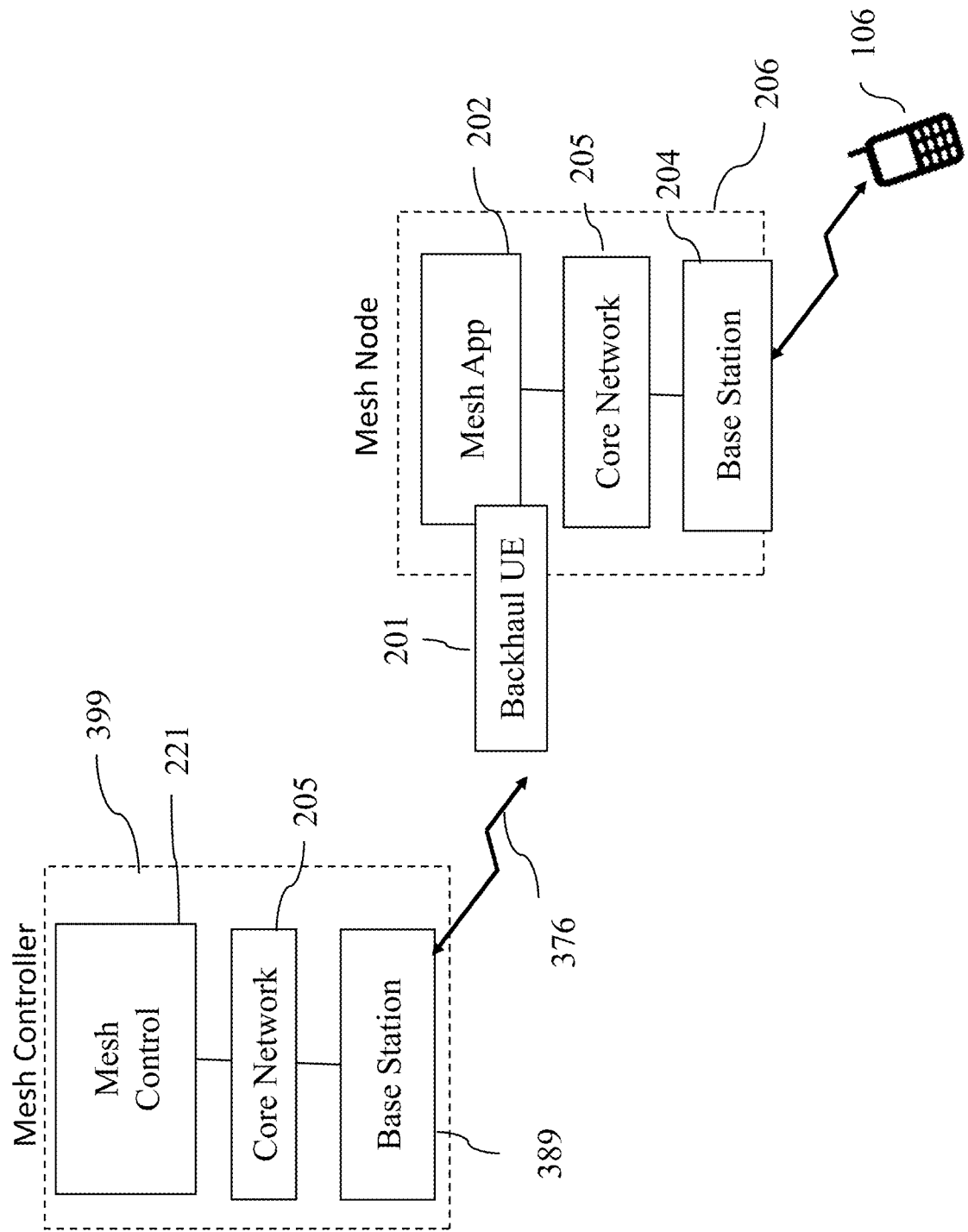

FIG. 3b illustrates the control channel connectivity between the mesh node and the controller. Note that the connectivity is achieved using a backhaul UE, just like the connectivity between the mesh nodes illustrated in FIG. 3a, with a distinction that the controller does not have any backhaul UEs. Core network 205 is only used to forward 'unknown' packets received on the control channel. Each backhaul UE that connects to the controller has an IP address from the controller's IP address space. If the control channel is in-band, then not all nodes would have direct attachment to the controller as illustrated in the figure, but some of the control channels would be over the node-to-node connectivity illustrated in FIG. 3a.

Figure 4A:
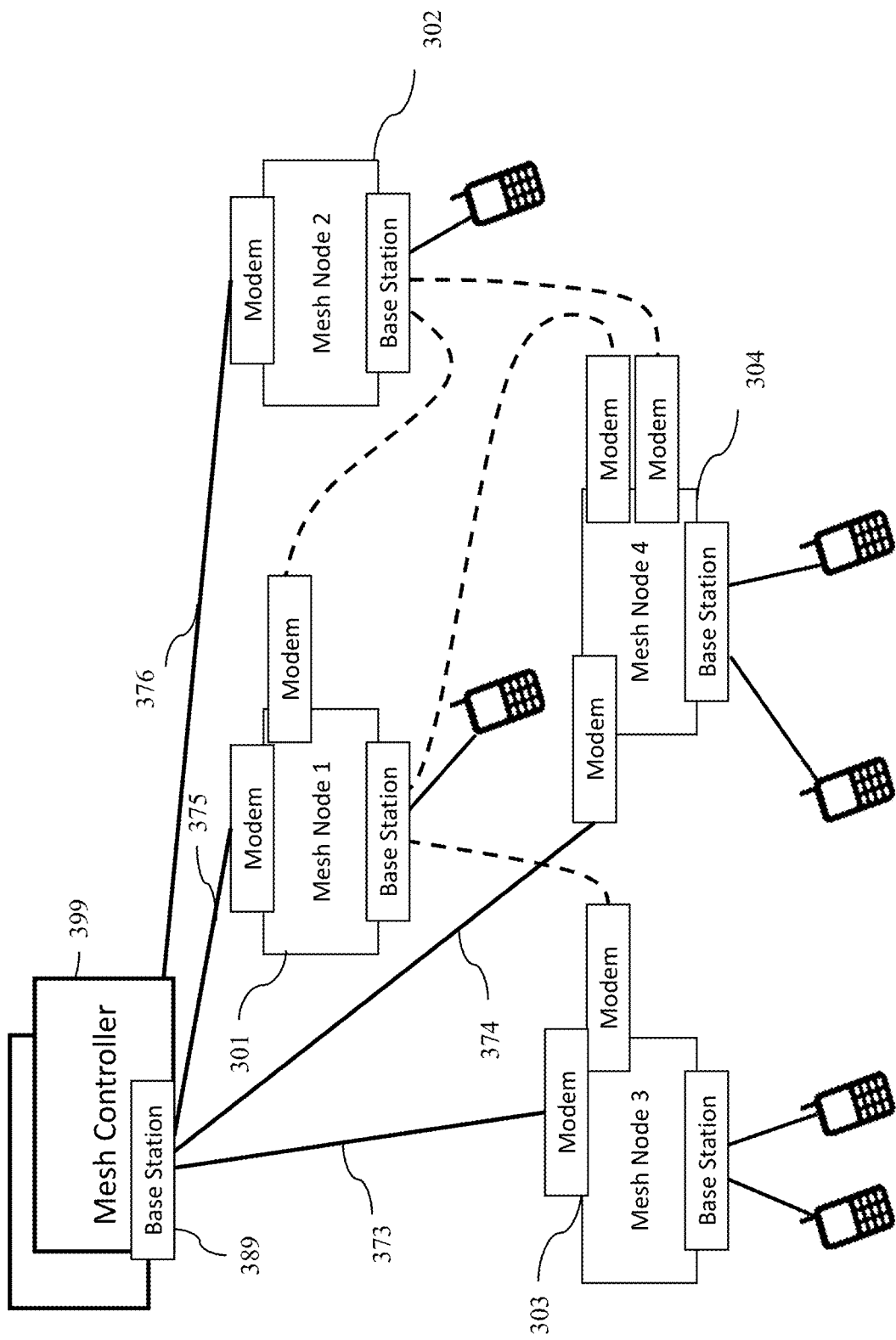
FIGS. 4A and 4B show two different topologies of the same mesh network attained using the mesh control and mesh app according to an aspect of the invention.
Figure 4B:
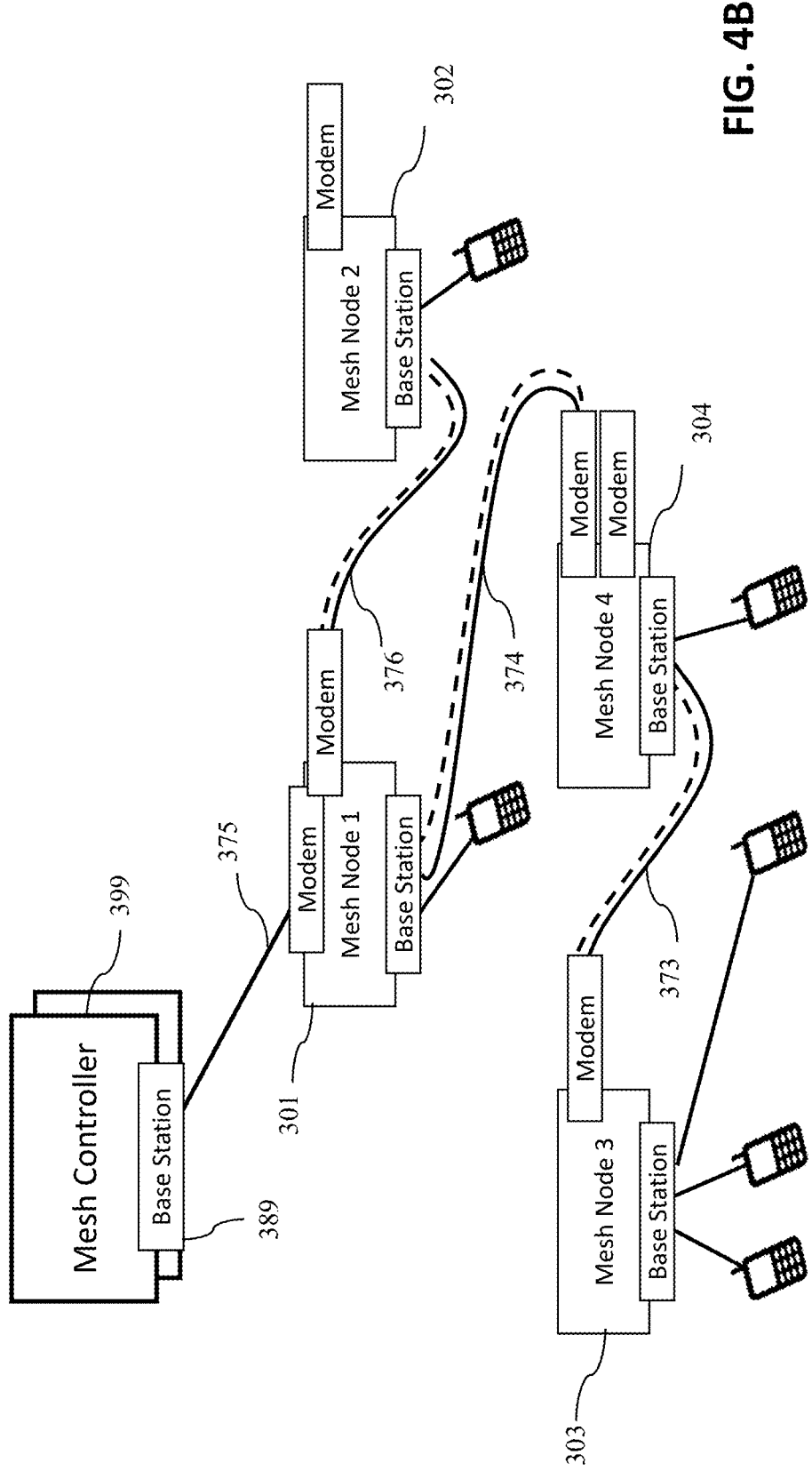

Two simple topologies of the same mesh network with four nodes are illustrated in FIGS. 4a and 4b. In both topologies, controller 399 is attached to nodes 301 through 304 using control channels 373 through 376. In the network of FIG. 4a, all nodes are directly attached to controller 399 with out-of-band control channels. Mesh node 303 connects to mesh node 301 via a radio interface using the backhaul modem of node 303. Similarly, mesh node 301 connects to mesh node 302, and mesh node 304 connects to both mesh nodes 301 and 302. Also, radio access UEs are illustrated that directly connect to the mesh nodes. In the network of FIG. 4b, the topology of the network is altered such that mesh node 303 now connects to mesh node 304 via modem (or backhaul UE) to adapt backhaul topology to changing channel conditions and distances between mesh nodes. Note that the radio access UE under mesh node 4 is moved to mesh node 3 in FIG. 4b for load balancing. Furthermore, the network of FIG. 4b has in-band control channels 373, 374 and 376. Identical mesh nodes are used in both FIGS. 4a and 4b, but completely different data network topologies and control network topologies are obtained by forcing to reconnect backhaul UEs to different base stations, according to an aspect of this invention. When controller 399 receives topology and link quality information from nodes 301 through 304, it can migrate the network topology as illustrated in the figures.

Figure 5A:
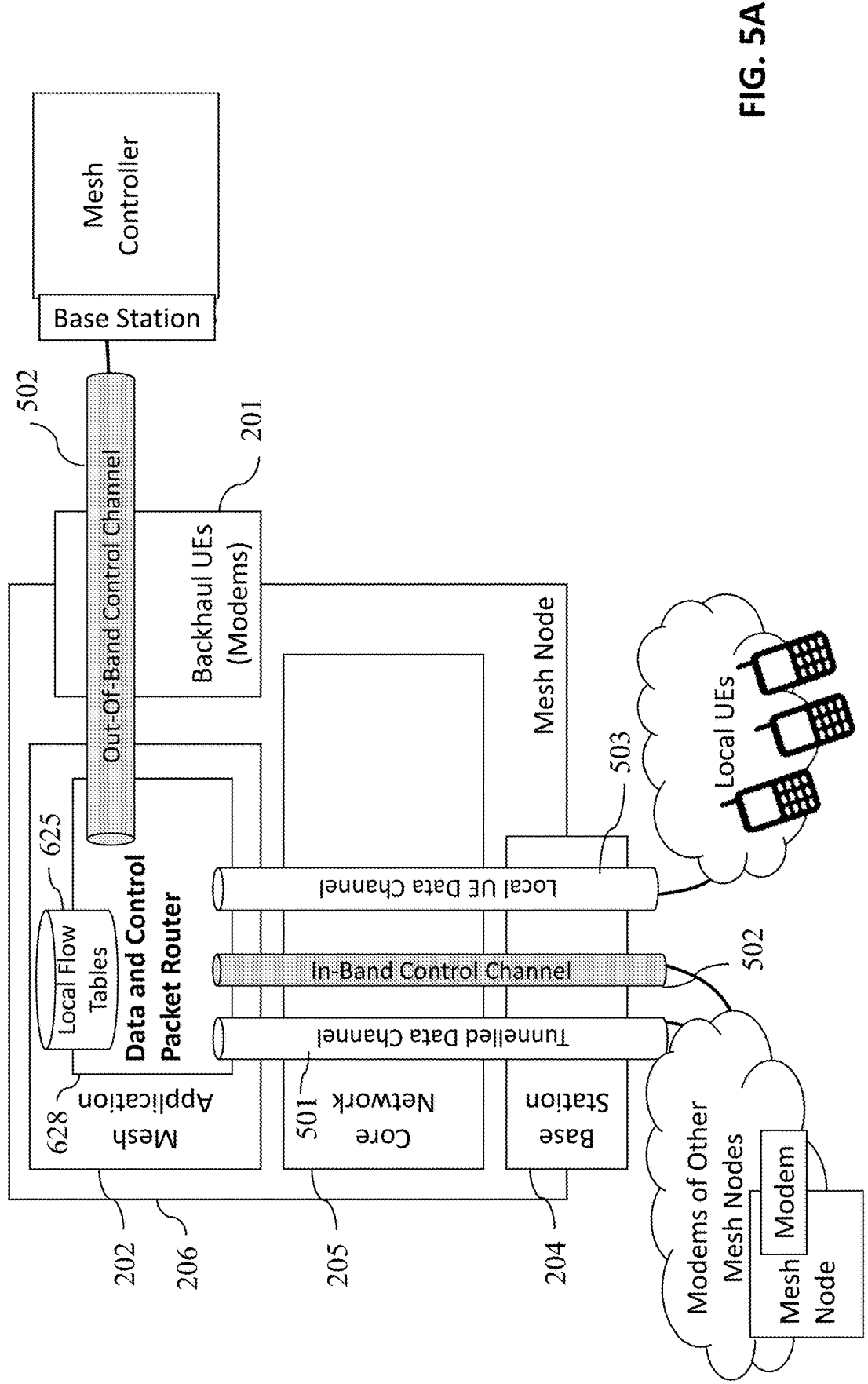
FIGS. 5A and 5B show the communication channels of a node and controller, respectively.
Figure 5B:
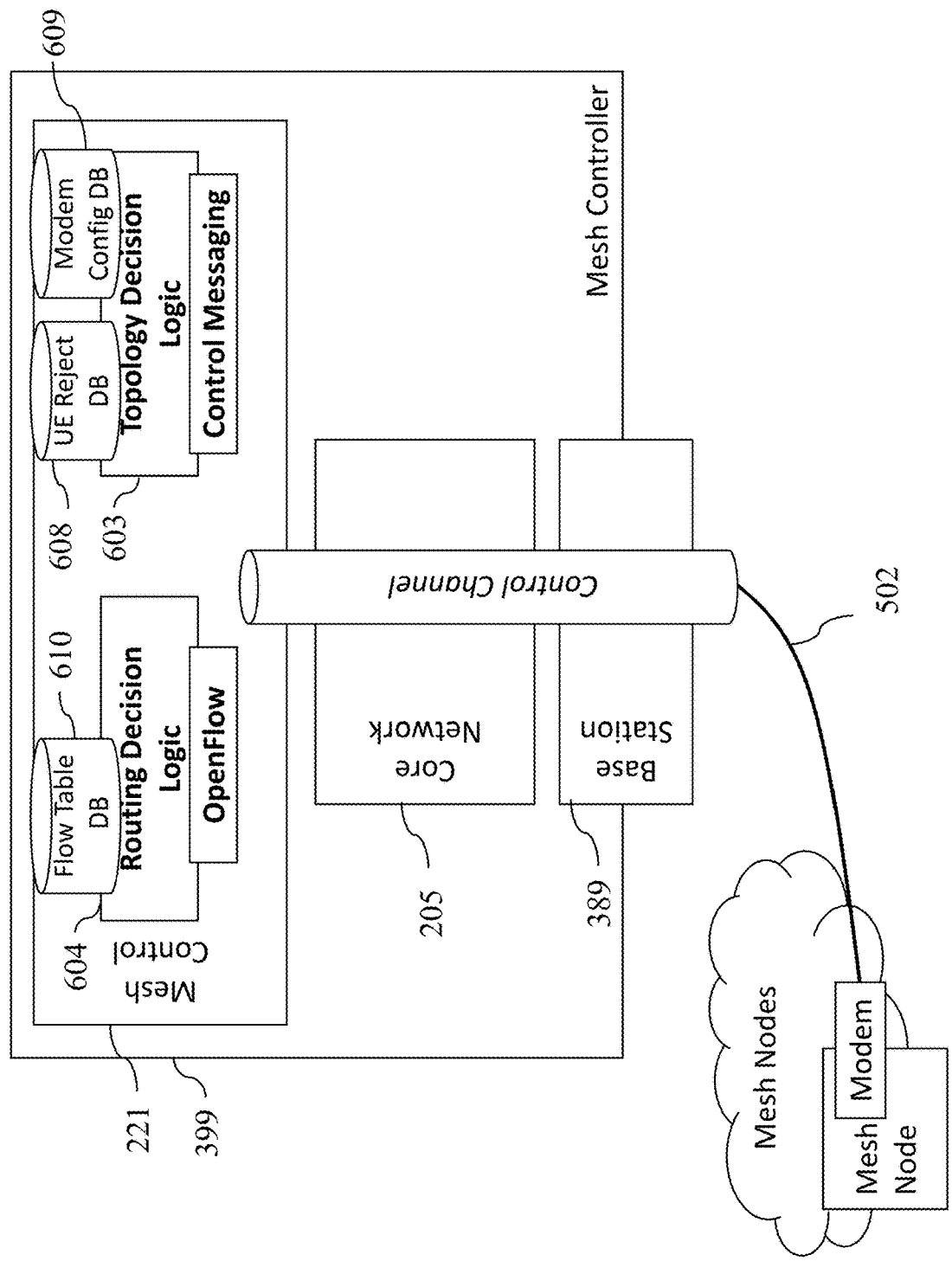

FIG. 5a illustrates a high-level block diagram of the node and its various connectivity. Using backhaul modem 201, the node can optionally have a direct/out-of-band control channel connectivity, which is control channel 502 towards the controller, and/or it can have an in-band control channel as illustrated between two neighboring mesh nodes. It is important to note that a node may have both types of control channels; an out-of-band control channel for its own connectivity to the controller (maybe because the controller is in its neighborhood), and an in-band control channel to connect a neighbor node to the controller. Also shown in FIG. 5a are (1) the tunneled data channel 501 to forward data packets to a neighbor node, (2) the local UE data channel 503 to forward data packets between the UEs attached to the same node, and (3) the in-band control channel 502 to carry control messages of the controller. Control and Data Packet Router 413 residing within the Mesh App 202 uses Flow Table 415 to determine where to forward packets. FIG. 5b illustrates the connectivity of controller 399 to mesh node. Within controller 399, mesh control 221 has two key functions Routing Decision Logic 604, which includes OpenFlow functions, and Topology Decision Logic 603, which manages the control and data network topology. Control channel 502 connects controller 399 to the mesh node.

Figure 6A:
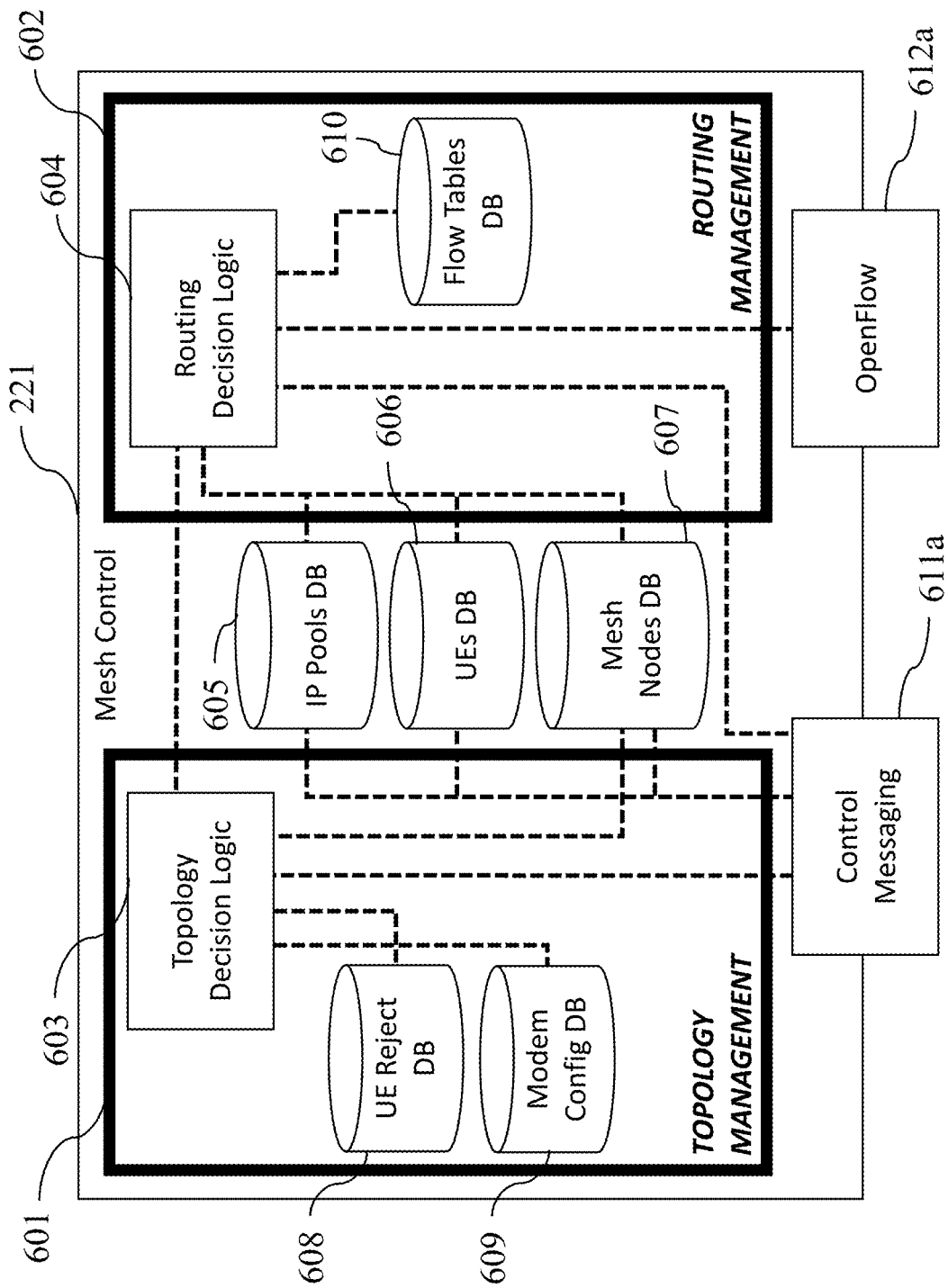
FIGS. 6A and 6B illustrate the high-level block diagram of the mesh control and mesh app, respectively.
Figure 6B:
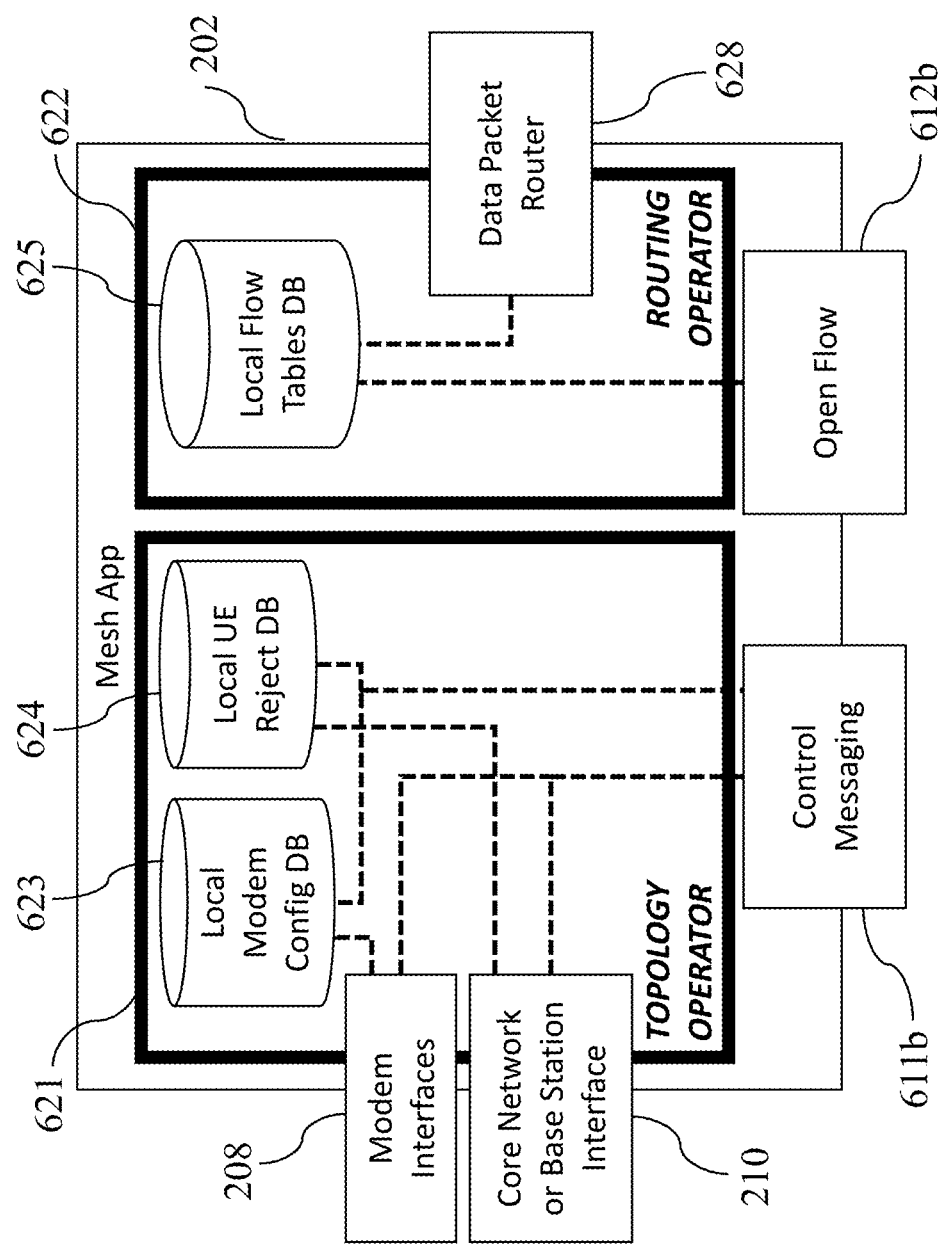

FIGS. 6a and 6b present block diagrams of interfaces, inner databases, and functions of mesh control and mesh app, respectively. Two main management modules exist in mesh control 221, (1) topology management 601 and (2) routing management 602. Besides, there are three databases; (1) IP pools database 605, which maintains local IP pools that are connected to remote mesh nodes for routing, (2) UE database 606, which maintains IPs of connected remote UEs and their serving mesh node identity, and (3) mesh nodes database 607, which maintains identity, hop distance, sequence number, topology and adjacency information of all mesh nodes of the network. Both 605 and 606 maintain IP-based rewrote destinations, wherein first one keeps distinct IP addresses, while the other keeps a range of IP addresses as database entry. Routing management module 602 includes routing decision logic 604, which makes central routing decisions on any part of the mesh network and keeps the last update of the routing rules in flow tables database 610. Topology management module 601 includes topology decision logic 603, which makes topology alteration decisions centrally. The topology decisions can be implemented by both (1) on the modem side by changing modem configuration, which is maintained in 609, or (2) on the core network side by changing admission control, which is maintained in UE reject list/database 608 for inner core network 205 of each mesh node. Mesh control 221 inherits all protocol capabilities of OpenFlow 612a, which is managed by routing decision logic 604. However, the other control messages, which are part of this invention, are transmitted by control messaging function 611a, which uses inner databases 605, 606, 607 and both topology and routing logics, 603, 604.

Mesh App 202, as presented in FIG. 6b, includes two modules (1) topology operator 621 and (2) routing operator 622. Routing operator 622 includes local flow tables' database 625, which is configured by OpenFlow messaging coming from mesh control, 221. Every time a packet comes to the data packet router 628 of the mesh app, the packet is routed using the information in table 625. Topology operator 621 includes databases for local modem config 623 and local UE reject 624. These databases are only configured by control messaging between 611a and 611b. Local modem config database 623 includes cell selection and sensing rules, which are implemented by modem interface 208. Similarly, local UE reject list/database 624 maintains the list of UEs, which a not allowed to connect, configured by interface 210.

Each mesh app 202 is responsible for sending event-based and periodical information to central decision maker, mesh control 221. Even though OpenFlow protocol 612a has its own control messaging structures, requirements of cellular networks and dynamically changeable mesh topology necessitate the mesh app to deploy additional control messaging structures. The additional control messages are transmitted between 611a and 611b. 611b should inform mesh control 221, whenever a UE is connected/disconnected or a new backhaul connection is established/removed. Moreover, 611b is responsible to inform mesh control 221 of its adjacency information to other mesh nodes, using the information provided from modem interface 208. Whenever 611a receives an information update, it forwards to decision logics, 603 and 604, and sends new decisions to related mesh apps 202 via 611a and 612a. While topology and routing management decisions are highly interrelated, mesh control may request topology directives first, and then based on the success/failure of implementation of such directives by the mesh node, new flow tables are crafted and sent to the mesh node as illustrated in following sequence scenarios.

Base station in each mesh node and controller must be configured with a different cell id and Tracking Area Code (TAC) in 4G/LTE [or a different Location Area Code (LAC) in GSM/3G] to distinguish them, but with the same Public Land Mobile Network (PLMN) ID to group those as part of the same mesh network. Different TAC [or LAC] is required to prepare the 'UE Reject List' according to TAC/LAC rejected.

It is pertinent to this patent application to understand the LTE UE's cell selection procedure because this process is leveraged to achieve instant mesh network topology changes by (1) changing the selection of a connection between a backhaul UE and its adjacent base stations in other mesh nodes and the controller; and (2) changing the selection of connections of UEs (i.e., which UE connects to which mesh node). Similar cell selection procedures of UMTS (3G) and 5G are applicable for the same purposes. The UE (backhaul or radio access) measures the signals from every supported frequency band and compares them with a threshold for detection of the nearby cells. The UE then decodes Master Information Block (MIB) and System Information Blocks (SIBs) coming from the candidate cells and obtains identifiers such as Public Land Mobile Network (PLMN) id, Physical Cell ID (PCI), Tracking Area Code (TAC) of each cell/base station. The selection of the base station to attach to depends on the UE's pre-defined PLMN priorities and forbidden TAC lists, or signal strength. A 'forbidden list' is updated depending on the last errorless service taken or previously received rejections.

The rejection of a UE's attachment to a base station is leveraged for the change of connectivity topology of the data and control network according to this patent application. As illustrated in FIG. 5a, UE Reject DB 608 placed within Topology Manager 603 is a vital component of controller 399. Topology Manager 603 has a direct connection for gathering information and directing the topology management of peripheral control connections. The UE reject database, 608, which maintains list of UE IMSIs, rejection causes, deciding mesh node identity, and validity time. When validity time for an entry time UE reject database times out, it is removed from the list. Note that sometimes a rejection of a backhaul UE is simply caused by a topology directive message received from the controller, with the goal of a directive of rejecting that UE's connection is intended to force its connection to another mesh node. The main goal of the topology decision logic is to decide feasibility of every connected backhaul link or normal UE connection. Hence, it periodically evaluates the backhaul and normal UE link qualities and discriminates or rejects infeasible or poor quality links. Controller 399 triggers a topology management action per this invention. Each node provides the received power information of active (and possible passive) connection of each backhaul modem and provides the modem reset function. Backhaul modem reset function is triggered by topology decision logic, when the modem does not connect to any base station for a while, due to being rejected by all base stations, or when a long inner timer expires after an unsuccessful connection.

In LTE, a base station can reject the connection request of a UE. The rejection and its cause can be sent by the base station to UE in following exemplary messages;

ATTACH REJECT MESSAGE
TRACKING AREA UPDATE (TAU) REJECT MESSAGE
UPDATE REJECT MESSAGE
SERVICE REJECT MESSAGE
DETACH REQUEST MESSAGE

All these messages are well defined by the LTE standards. The Mobility Management Entity (MME) subcomponent of a Core Network has a configurable 'Rejection List'. If a UE's IP address is in this list, the Core Network will deny the connection. If a UE is in the rejection list of the MME, the MME responds to that UE's ATTACH REQUEST MESSAGE with an ATTACH REJECT MESSAGE and responds to UE Tracking Area Update (TAU) with and TAU REJECT MESSAGE. Both rejection messages include a 'rejection cause' section. Once the UE receives a rejection of connection, it enters into a different state and stores the TAC ID (TAI) of the rejecting node in its 'forbidden Tracking Area list'. Some exemplary rejection causes and their consequent states (as defined in 3GPP TS 24.301) are as follows;

12 (Tracking area not allowed): The UE shall store the current TAI in the list of "forbidden tracking areas for regional provision of service" and enter the state EMM-DEREGISTERED.LIMITED-SERVICE.

13 (Roaming not allowed in this tracking area): The UE shall store the current TAI in the list of "forbidden tracking areas for roaming". Additionally, the UE shall enter the state EMM-DEREGISTERED.LIMITED-SERVICE or optionally EMM-DEREGISTERED.PLMN-SEARCH.

15 (No suitable cells in tracking area): The UE shall store the current TAI in the list of "forbidden tracking areas for roaming" and enter the state EMM-DEREGISTERED.LIMITED-SERVICE.

22 (Congestion): This rejection cause is sent with T3346 value, which is called the congestion timer. If the ATTACH REJECT message is received, the UE shall start timer T3346 with the value provided in the T3346 value. The UE stays in the current serving cell and applies the normal cell reselection process.

In an embodiment of this invention, the control information exchange between mesh app and mesh control along the control channel, excluding OpenFlow messages, is formulated in four new messages:

HEARTBEAT message, which is sent periodically on each control channel and only includes the identity of the sender. This message is used to ensure that the link is alive. HEARTBEAT is used on the node to node control channel as well as the control channel between the node and the controller.

INFO message, which includes the sending mesh node's identity, sequence number, hop count, list of its 'directly attached UEs', list of its 'cable connection IP pools', list of 'adjacent mesh nodes', which are backhaul modem connected, with their signal powers. The INFO message is sent on every control channel periodically, and also in every instance of 'attach' and incoming 'handover' procedure. When the controller receives an INFO message from a mesh node, it records it in its database and updates its flow tables accordingly. Upon each update, the controller sends new flow tables to those nodes that are affected by the change and have to update their flow tables.

TOPOLOGY DIRECTIVE message, which includes topology alteration directive that is sent from the controller to the nodes, including controller's identity, and the directive's validity time. The directive may be (1) modem config for a customized modem to connect desired mesh node, (2) rejection request for particular backhaul modems governing a control channel or data channel, or (3) load balancing request for radio access UEs. The directives may also come manually from the system administrator, or alternatively by deploying a policy server and a policy database within the topology management logic within the Mesh Control, wherein the policies, if any, regarding backhaul connections and radio access UEs are stored in the policy database. TOPOLOGY DIRECTIVE message must always be responded with Success or Failure, to indicate if the attempt to alter the physical link connectivity has been successful or not.

LINK QUALITY INFO message, which includes the information quantifying the quality of various cellular links as perceived by the sending mesh node. Besides, this message may include quality of non-connected adjacent mesh nodes, if a customized modem is deployed. This message is sent from a mesh node to the controller to aid the controller to determine a change in the connection topology of the sender.

Figure 7:
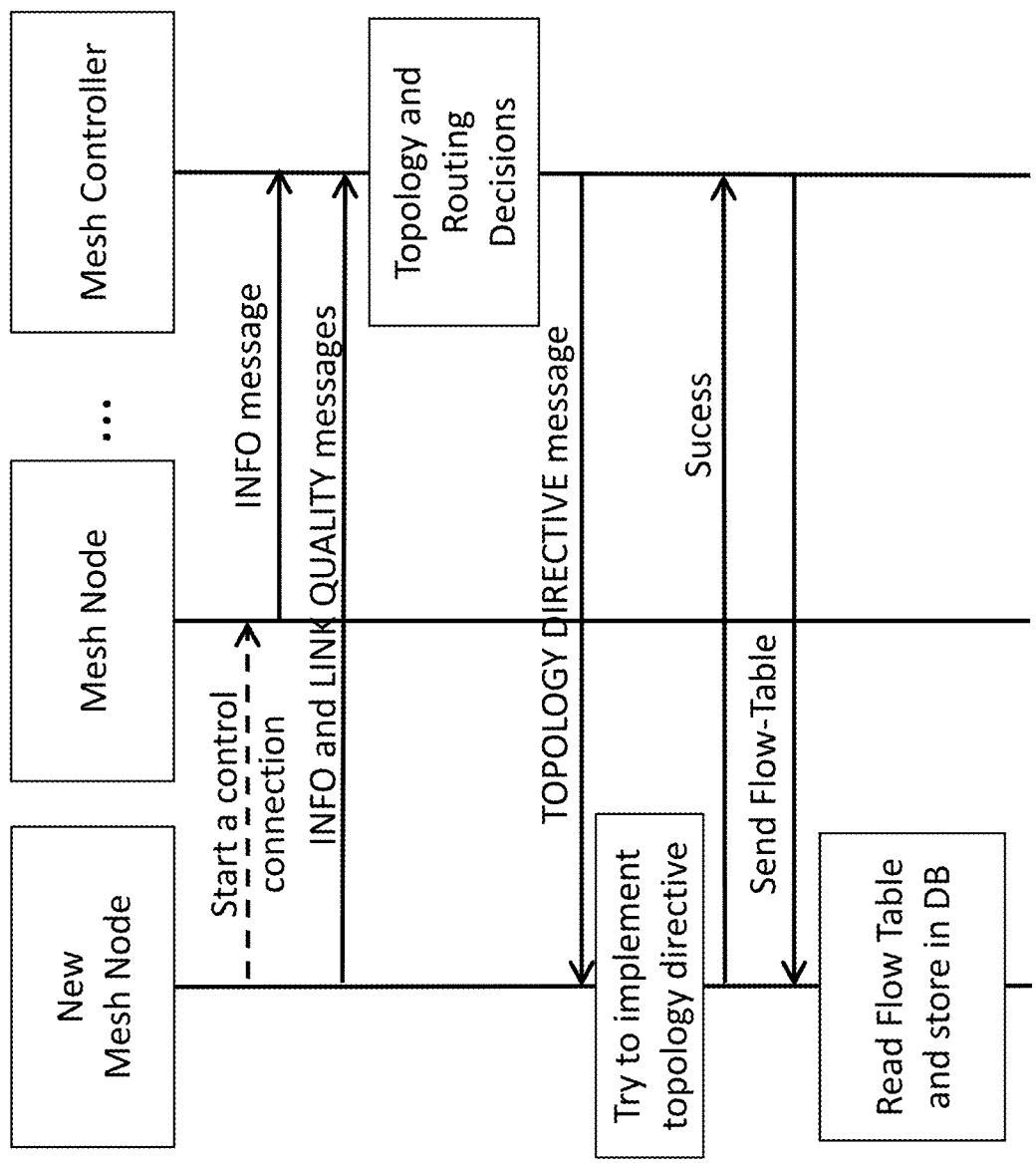
FIG. 7 illustrates the sequence diagram of a new mesh node joining the network.

In order to illustrate the use of the aforementioned control messages, a simple in-band control channel establishment scenario that occur then a new mesh node is added to the network, and the corresponding exemplary sequence of messaging are illustrated in FIG. 7. The sequence messaging in the figure is also valid for out-of-band control channel where the adjacent mesh node in-between the new node and the controller does not exist, and consequently the INFO message does not apply. First, a new mesh node's backhaul modem connects to the base station component of its adjacent mesh node, which already has an established control channel towards the controller. Then, the base station end of the link gets notified by the connection and identifies that the connecting UE as a backhaul modem from its IMSI. The adjacent node provides an IP address to the backhaul modem of new mesh node from its own IP address pool, and starts a transport layer connection, such as TCP or SCTP. An in-band control channel is now established between the newly connected node and its adjacent node. Once that control channel is established, said adjacent node sends an INFO message to the controller first, introducing the newly connected neighbor mesh node to the controller, and the newly established control channel. Upon this message, controller registers the identity of the new mesh node, its adjacency information and the new control channel. Meanwhile, the new mesh node sends, using the control channel, an INFO message towards the controller, introducing its own locally connected UE's and neighbors along with an optionally LINK QUALITY message listing the perceived quality of links towards all its neighbor nodes. The controller reevaluates the network topology including the newly established control channel in topology decision logic 603 and may optionally send a TOPOLOGY DIRECTIVE message to force the newly connected node to change its data and/or control channel topology if there is a better topology alternative. In response, the newly connected node executes the topology directive, and responds to the controller with a SUCCESS message. The controller, in turn, stores this information, and using its routing decision logic 604, re-computes the flow table accordingly, and sends this table to the newly connected node as well as other affected nodes using the OpenFlow protocol. Each node, upon receiving the message, stores the tables in their local flow-table database 625.

A Mesh App must always configure its core network to reject its own backhaul modem connection attempts to avoid connecting to itself. A Mesh App can also reject the connection of certain backhaul modems of neighboring mesh nodes to steer the connectivity topology of the network according to instructions from the Mesh Control. Note that the network connectivity/topology is governed by the backhaul modem-to-base station connections of adjacent nodes. Furthermore, the Mesh App may need to reject normal UEs simply to transfer load to other mesh nodes, again according to the instruction from the Mesh Control. The topology management is achieved by: (1) adding certain backhaul modem IMSIs to the 'UE rejection list' and forcing them to detach for backhaul topology management, (2) adding normal UE IMSIs to the rejection list and forcing them to detach for forced load management of UEs (i.e., transferring them from one mesh node to another without a handover), and (3) adding normal UE IMSIs to the rejection list, and then commanding the mesh node to perform handover for load balancing without interruption of active data connections. For each rejection list entry, the rejection cause such as #15 may cause the UE not to reconnect to that mesh node until the UE is reset, or #22 may cause the UE not to reconnect to the mesh node only during a pre-defined timer.

The Mesh App is responsible for storing and updating its routing table based on the received flow tables from the Mesh Control. Each Mesh App receives packets from an attached radio access UE, and based on the destination IP address of the incoming packets, it will either send the packets directly to its Core Network for a local transmission or tunnel it to send to a remote Mesh App according to the flow table. When a LE attaches or detaches from the Core Network or if there is a handover, an INFO message is sent from the local Mesh App to the Mesh Control so that the controller can update other Mesh Apps and their local routing tables accordingly about the topology change. Note that the Mesh App can't route packets directly to the destination of the IP packet when the destination address is not within the coverage of the Mesh Node of that Mesh App because, the destination IP address of the packet is not known within the Mesh Node and it would not be sufficient to simply bypass the radio access network and the air interface. Therefore, it has to be tunneled across the two mesh nodes, wherein the source and destination radio access UEs are within the coverage areas of these two Mesh Nodes.

Not all Mesh Nodes are created equal. One Mesh Node may need more resources than others and/or may require prioritization. For example, a sink node may require prioritization because it provides Internet connection and therefore most of the traffic gets concentrated around it. In other cases, number of radio access UEs connected to a specific Mesh Node would be much higher than others, or its coverage area would be large. In these cases, the topology management subcomponent of the Mesh Control adjusts the number of UEs connected to a mesh node accordingly using TOPOLOGY DIRECTIVE messages.

In addition to the new control messages between the mesh node and controller, there are three types of timers: connection timer, mesh node timer and mesh control timer. For every neighbor mesh node connection and the control channel connection towards the controller, the Mesh App and Mesh Control maintains a 'connection timer' to test if the connection is still alive. When the Mesh App or Mesh Control receives a HEARTBEAT, it resets the connection timer to maximum. When the Mesh Control receives an INFO or LINK QUALITY message from a Mesh App, it sets the connection timers well as the mesh node timer of that node to maximum. When the Mesh App receives a TOPOLOGY DIRECTIVE or Open flow message from the Mesh Control, it sets the connection timer as well as the mesh control timer to maximum. Lack of any messaging expires these timers, which is indirectly used as an indication of a possible network failure.

Figure 8B:
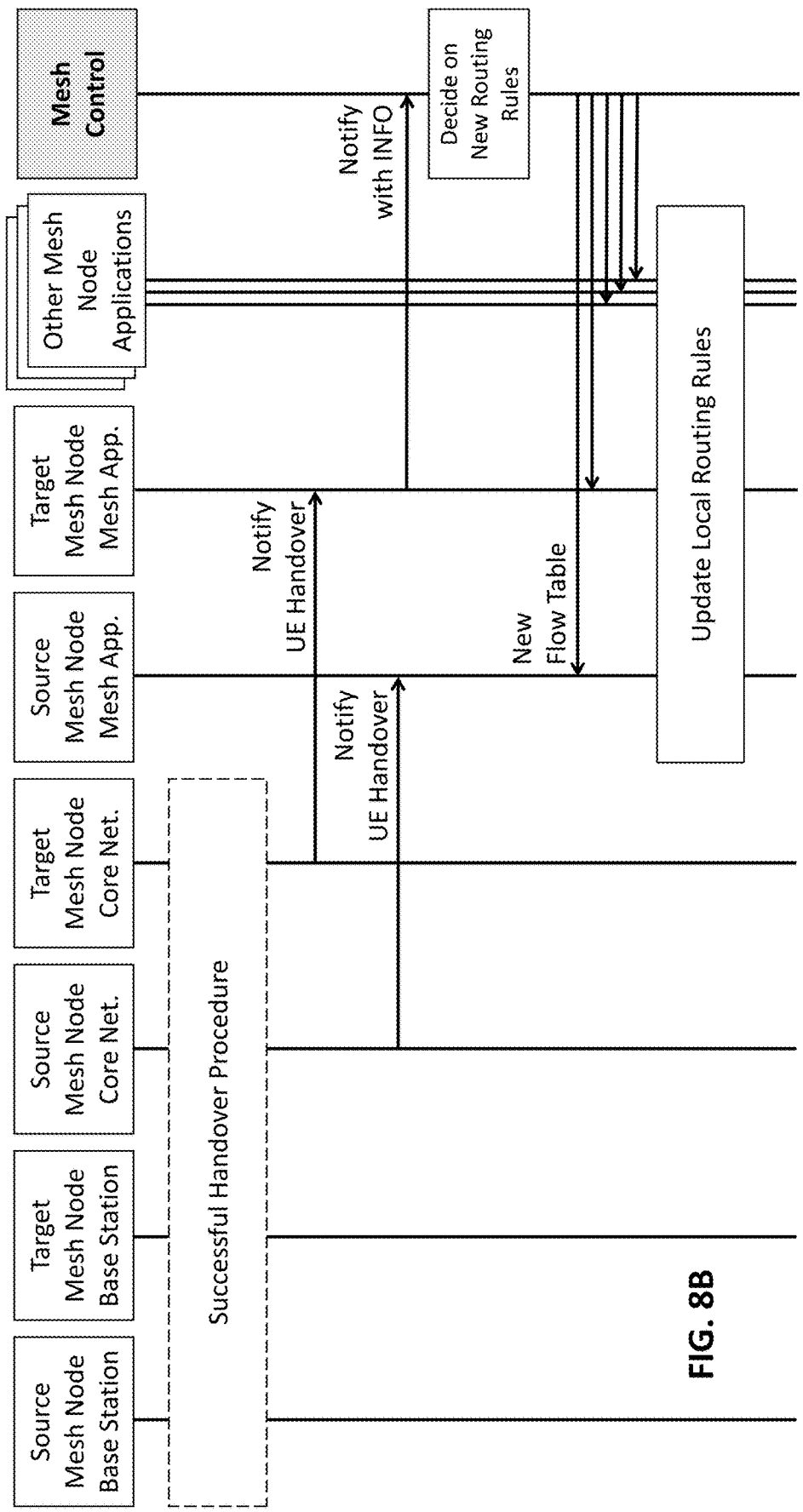

FIG. 8a illustrates the attachment procedure of a new UE to a mesh node. Upon attachment, the Mesh App or the mesh node adds the UE's IP address to its database and triggers an INFO message to inform the Mesh Control about the new UE's IP address. In turn, the Mesh Control updates its topology database and re-computes routes. The Mesh Control sends new flow tables to all mesh nodes about the newly attached UE. FIG. 8b illustrates the handover procedure of a UE from a source node to a target node. The source Mesh App deletes the UE from its routing tables while the target Mesh App adds the UE to its routing tables, and both of these changes trigger INFO messages from both the source and target Mesh Apps towards the Mesh Control. In turn, the Mesh Control updates the routing tables and sends new flow tables to all mesh nodes.

Figure 9:
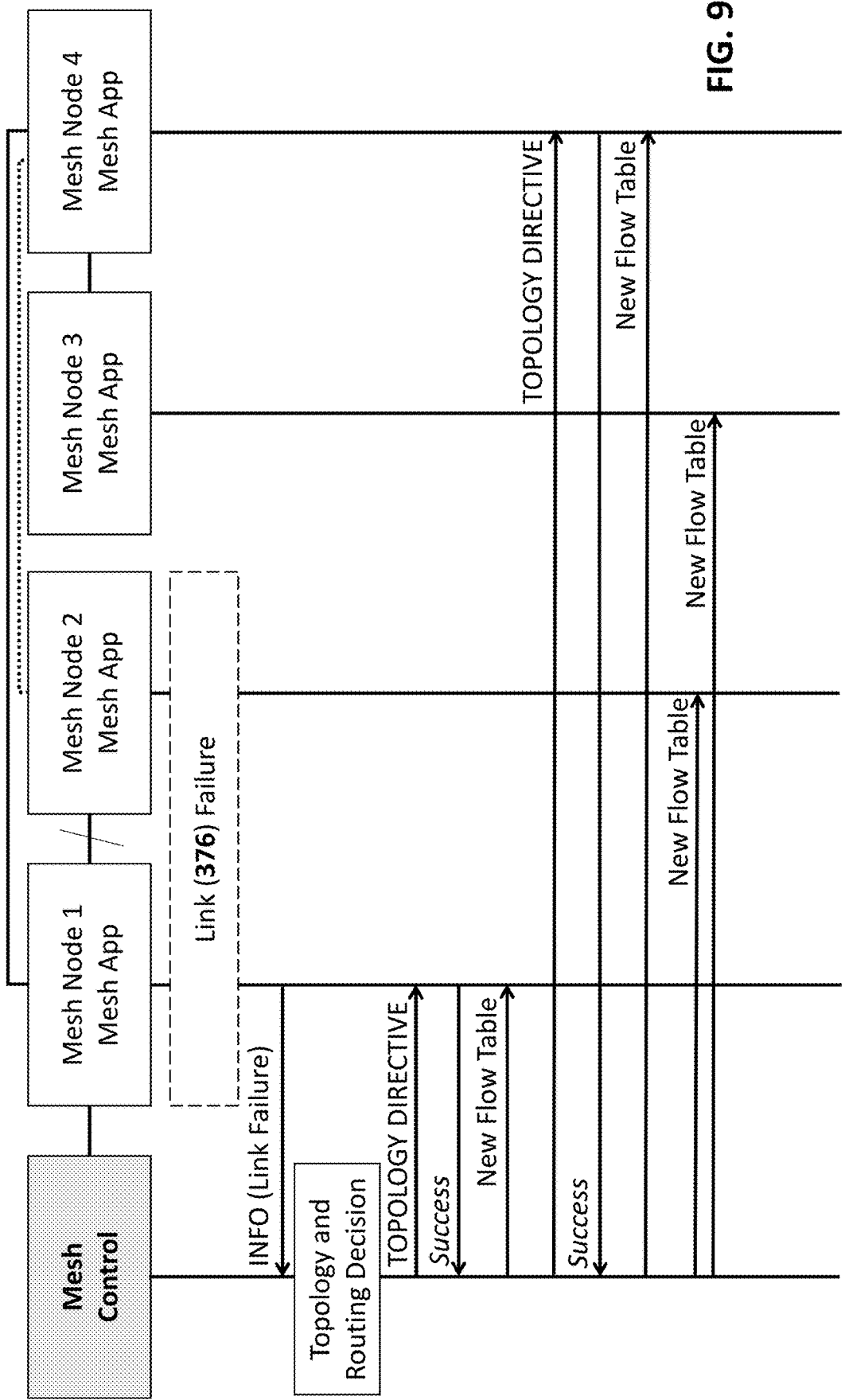
FIG. 9 illustrates the sequence diagram of self-healing mechanism, when a backhaul link fails.

Another exemplary scenario of topology management is illustrated in FIG. 9, wherein link 376 between mesh nodes 1 and 2 fails in the network topology that illustrated in FIG. 4b. Self-healing is easily attained after a sequence of topology management events. When Mesh Control notices that the connection towards mesh node 2 is no longer alive (by watching the lack of HEARTBEAT on the in-band control channel, for example), it changes its databases and re-computes routes and decides to connect node 4 to node 2. In the self-healing scenario, TOPOLOGY DIRECTIVE and flow tables are sent in an order starting from the closest mesh node to the controller to the farthest one. First, mesh control sends a TOPOLOGY DIRECTIVE to mesh node 1 to remove IMSI of the backhaul modem of mesh node 2 from the reject list (of mesh node 1) to allow a potential connection attempt from mesh node 2. Once it succeeds, it sends a new flow table to mesh node 1. Thereafter, it sends another TOPOLOGY DIRECTIVE message that includes modem config for the idle modem of mesh node 4 in order to connect it to mesh node 2. Upon its success, it sends new flow tables to all affected mesh nodes since the network topology is modified.

The Core Network knows thy: IP addresses of all UEs and Backhaul UEs attached to itself through the registry process, and thus it knows how to route data packets to destinations within the coverage of its collocated mesh base station. However, it can't route IP traffic destined to radio access UEs attached to different mesh nodes. The Core Network continuously notifies the Mesh App of the 'Network Attach', 'Network Detach', and 'Handover' events to keep an accurate registry of all locally supported IP end points. Doing so, the Mesh App obtains all local IP addresses from the attached Core Network. Meanwhile, it learns from the Mesh Control the remote IP addresses from the Mesh Apps in other mesh nodes to be able to route packets beyond the coverage of its own Mesh Node. Besides periodic INFO messages generated by each Mesh App towards the Mesh Control, the INFO message is instantly generated in two events; (1) when a UE attaches as illustrated in FIG. 8a, and (2) when a UE handover occurs towards the mesh node as illustrated in FIG. 8b. The Mesh App may elect to group some of the attach/handover events in a single INFO message to minimize the number of INFO packets—while carefully considering to minimize potential packet losses due to instant configuration changes while waiting to group events. When a Mesh App receives a new flow table from the Mesh Control, it reads the contents and updates its flow tables accordingly.

CONCLUSION

A system and method are developed for a mesh (or relay) network controlled by a controller to dynamically change the topology of a mesh network connectivity comprised of many mesh nodes and to efficiently route IP packets across the network, wherein a control channel is established between each node and the controller, the channel terminating on the systems of invention, so called Mesh App and Mesh Control, on said mesh node and controller, respectively. The Mesh App collects local wireless user equipment IP addresses from the local Core Network and IP addresses of all its neighbor nodes and relays this information to the Mesh Control. In turn, the Mesh Control sends forwarding tables as well as topology directives to the Mesh App so that it can route data traffic hop by hop across the entire network. Mesh Control changes topology simply by adding (and deleting) UEs in the 'reject list' of the mesh node forcing the disconnection of certain radio access UEs and backhaul modems which in effect alters the topology of the network. Mesh Control triggers topology changes upon receiving in real-time information from said Mesh App regarding different link qualities.

The invention claimed is:

1. A method as implemented in a mesh control software that is part of a controller, the controller controlling a plurality of nodes, the controller having a first base station that is connected to at least one node via a first set of backhaul user equipment associated with the node, the node having a second base station, a plurality of directly attached radio access user terminals and a mesh app software running within, the method comprising:
   (a) node establishing a control channel towards the mesh control software and the mesh app software within node to exchange control messages;
   (b) receiving, from the node via the mesh app software, a list of identifiers of one or more neighboring nodes and said directly attached radio access user terminals;
   (c) receiving one or more unknown data packets from the node via the mesh app software;
   (d) sending a flow-table to the mesh app software for use at the node to route data packets;
   (e) sending a topology directive to the mesh app software instructing said second base station associated with the node to reject a remote backhaul user equipment associated with a neighboring node to alter network topology.

2. The method of claim 1, wherein the control messages in (a) are used in topology management and data packet routing, and the control messages in (a) comprises any of, or a combination of, the following:
   (a) a heartbeat message to inform other end of the control channel that control connection is alive;
   (b) an info message generated by the node to inform the controller about at least the identity of the node, list of its directly attached radio access user equipment identifiers, and list of its adjacent nodes;
   (c) a topology directive message from the controller to the node to request a topology management action on an attachment of a remote backhaul user equipment or a particular local radio access user equipment, such as a 'rejection' of an attachment request to change topology; and
   (d) a link quality message from the node to the controller to inform the controller about the quality of all wireless connections of the node.

3. The method of claim 2, wherein the info message is sent on an event driven basis when a local radio access terminal or backhaul user terminal attach, detach, handover, or reselect a cell.

4. The method of claim 2, wherein the info message is sent on an event driven basis when a given node's local radio access or backhaul user equipment detaches, or another node's local radio access or backhaul user equipment attaches to the given node.

5. The method of claim 1, wherein the identifiers in (b) are any of the following: the IMSI and IP address.

6. The method of claim 1, wherein at least one communication is implemented via an IP tunnel.

7. The method of claim 1, wherein the backhaul user equipment is any of the following: a UMTS (3G), LTE (4G), or 5G modem.

8. The method of claim 1, wherein the first or second base stations are any of the following: a gNode-B, an eNode-B, or a Node-B.

9. A topology alteration method as implemented in a mesh control software that is part of a controller, the mesh control software controlling a network comprised of at least a first, second and third mesh nodes, the first, second and third mesh nodes associated with internal first, second and third base stations, respectively, the first, second and third mesh nodes associated with a first, second, and third backhaul user terminals, respectively, the first backhaul user terminal being remote to the second mesh node, and the second backhaul user terminal being remote to the third mesh node, the first, second and third mesh nodes associated with a first, second, and third mesh app software, respectively, the first, second and third mesh nodes initially interconnected as follows: (a) the first backhaul user terminal of first node being attached to the second base station component via a first air interface forming an adjacency between the first and second nodes, and (b) the second backhaul user terminal of second node being attached to the third base station via a second air interface forming an adjacency between the second and third nodes, each of the three mesh nodes having directly attached radio access user terminals, the method comprising the steps of:

(a) maintaining an user equipment (UE) reject list in each of the first, second and third mesh app software, each UE reject list containing a listing of those UEs whose connection attempt to that mesh node are to be rejected with an associated reject reason, along with at least an identifier of local backhaul user terminals associated with those UEs, so that when a given backhaul user terminal tries to attach to its local base station, the connection is rejected by its local base station forcing it to attach to a remote mesh node's base station;

(b) sending, via the mesh control software, a topology directive message to the second mesh app requesting rejection of a connection request of the first backhaul user equipment to the second mesh app, the second mesh app adding the first backhaul equipment's identifier to its UE reject list and rejecting first backhaul user equipment's attachment to the second mesh node's base station, and (c) disconnecting the first backhaul equipment from the second mesh node's base station, while attempting to attach it to the third mesh node's base station, connecting and therefore altering the topology of connectivity between the three mesh nodes such that first node is now connected to third node instead of second node.

10. The method of claim 9, wherein the identifier in (a) is any of the following: the IMSI and IP address.

11. The method of claim 9, wherein at least one communication is implemented via an IP tunnel.

12. The method of claim 9, wherein the backhaul user terminal is any of the following: a UMTS (3G), LTE (4G), or 5G modem.

13. The method of claim 9, wherein the base stations are any of the following: a gNode-B, an eNode-B, or a Node-B.

* * * * *